United States Patent [19]
Mineki et al.

[11] Patent Number: 5,241,655
[45] Date of Patent: Aug. 31, 1993

[54] MENU PRESENTATION METHOD AND DATA PROCESSING APPARATUS

[75] Inventors: Kozo Mineki, Nagoya; Kiyoshi Masuda, Omiya; Masaki Fujiwara; Shigeki Taniguchi, both of Hitachi; Masaki Kawase, Katsuta; Yujiro Tatsuno, Hitachi; Kenichi Hironaka, Tokyo, all of Japan

[73] Assignee: Hitachi, Ltd., Tokyo, Japan

[21] Appl. No.: 436,682

[22] Filed: Nov. 15, 1989

[30] Foreign Application Priority Data

Nov. 15, 1988 [JP] Japan ................................ 63-288335

[51] Int. Cl.5 .............................................. G06F 15/62
[52] U.S. Cl. ...................................... 395/156; 393/159
[58] Field of Search ....................... 364/518, 521, 523; 395/155-161

[56] References Cited

U.S. PATENT DOCUMENTS

| | | | |
|---|---|---|---|
| 4,899,136 | 2/1990 | Beard et al. | 364/521 X |
| 4,901,221 | 2/1990 | Kodosky et al. | 364/200 |
| 5,001,654 | 3/1991 | Winiger et al. | 364/523 |
| 5,062,060 | 10/1991 | Kolnick | 364/521 |

Primary Examiner—Heather R. Herndon
Attorney, Agent, or Firm—Antonelli, Terry, Stout & Kraus

[57] ABSTRACT

A data processing apparatus has an input unit for entering operator data and commands, and a display unit for displaying a work area for data processing. The display unit opens a job menu window for displaying types of selectable jobs by icons at a center of a display screen when the operator needs to select a new job.

37 Claims, 22 Drawing Sheets

FIG. 2B

| COUNTRY | CAPITAL |
|---|---|
| AUSTRALIA | CANBERRA |
| CANADA | OTTAWA |
| FRANCE | PARIS |
| GREAT BRITAIN | LONDON |
| JAPAN | TOKYO |
| NEW ZEALAND | WELLINGTON |
| U.S.A. | WASHINGTON, D.C. |

JOB MENU

FIG. 14

ICON TABLE

| ICON NUMBER | START STATUS | PRESENCE/ ABSENCE OF LINKED ICON | LINKED ICON NUMBER | START PROGRAM NUMBER | POINTER TO ICON DISCRIPTIVE TEXT |
|---|---|---|---|---|---|
| 1 | O | ABSENCE | 0 | 1 | •──→ |
| 2 | O | ABSENCE | 0 | 2 | •── |
| 3 | O | ABSENCE | 0 | 3 | |
| 4 | O | PRESENCE | 2 | 4 | |
| 5 | O | PRESENCE | 1 | 5 | |
| 6 | O | ABSENCE | 0 | 6 | |
| 7 | O | PRESENCE | 3 | 7 | |
| 8 | O | ABSENCE | 0 | 8 | |

| ICON DISCRIPTIVE TEXT |
|---|
| NEW |
| |
| REGISTRA- TION |
| |
| |

SEPARATE ICON TABLE

| ICON NUMBER | START STATUS | PRESENCE/ ABSENCE OF LINKED ICON | LINKED ICON NUMBER | START PROGRAM NUMBER |
|---|---|---|---|---|
| 1 | O | PRESENCE | 5 | 5 |
| 2 | O | PRESENCE | 4 | 4 |
| 3 | O | PRESENCE | 7 | 7 |

MENU PRESENTATION METHOD AND DATA PROCESSING APPARATUS

BACKGROUND OF THE INVENTION

The present invention relates to a computer application product which performs various processings by utilizing a window and an icon displayed on a display unit, and more particularly to a data processing unit which processes data such as preparation and editing of a document containing different types of data, such as text, pattern, graph and image data.

In a conventional data processing unit which utilizes a display unit, various kinds of menus are provided by picture characters called icons which represent the contents of the menus, for the convenience of users.

For example, in a document processing unit which prepares and edits a document containing different types of data, such as text, pattern and graphic data, the selection of jobs, such as editing of text and printing, is effected using selecting an icon by a pointing device, such as a mouse, as disclosed in JP-A-63-138452. In this unit, all icons are always displayed at an end of a screen, and a user selects one of the icons to perform a desired job.

On the other hand, in JP-A-60-184288, the icons are not always displayed but they are displayed at an end of the display screen on request by manual operation, such as manipulation of the mouse or a special key so that a desired job is selected.

In JP-A-62-11927, when an icon is selected by a cursor, the shape of the cursor is changed to a menu item so that the displayed menu item can be moved to any point. Accordingly, a display area covered by the menu item is rendered visible.

In JP-A-62-239396, where one set of icons are displayed in a plurality of windows, the control to one icon is passed to all icon structures so that the icons in all windows are controlled. Thus, the matching between the icon display and the real state is attained.

In the above units, the selection means for icons is the mouse. JP-A-62-256121 and JP-A-63-26719, however, disclose systems in which the icon may be selected by either mouse or keyboard.

In the display screen of JP-A-63-138452, a display area for use in the preparation of text is narrow because the icons are always displayed. For example, where the number of dots of each character is to be increased to improve the quality of characters, the number of characters to be displayed is limited. This is a barrier for high quality. Further, since the icons are displayed in a small area at the end of the screen so that they do not overlap with other displayed information, it is hard to select the icon and a user may misselect the icon.

In JP-A-60-184288, the above problems are resolved to some extent but the icons are still displayed at an offset position. In any of the prior art, the content of the job represented by the displayed icon is not always easy to understand for the user, and the icons must be displayed in order for the user to select the icon. Accordingly, the operation is complex when selection frequently occurs.

In JP-A-62-256121 and JP-A-63-26719, the icon may be selected by key entry. However, in those systems, a specific number assigned to each icon is entered by the keyboard. Thus, an inherent feature of the icon, that is, the assurance of manipulation by pointing by the cursor is not effectively utilized.

SUMMARY OF THE INVENTION

It is an object of the present invention to provide a menu presentation method and a data processing unit in which icons are displayed in a selection mode in such a manner that the contents of jobs are easy to understand and the operation is effected in an easy and correct manner.

It is another object of the present invention to provide a menu presentation method and a data processing unit in which icons are displayed in such a manner that a sufficient work area is assured after the selection mode.

In order to achieve the above objects, in accordance with the menu presentation method of the present invention, a primary menu for data processing is presented by a plurality of icons which are displayed in a window at a center of a display screen, which window is opened only for a required time period.

In another aspect of the menu presentation method of the present invention, the menu for data processing is presented by a plurality of icons with corresponding explanatory descriptions in an icon display window on the display screen which window is opened only for a required time period.

In still another aspect of the menu presentation method of the present invention, the job menu for data processing is presented by a plurality of icons in the icon display window on the display screen which window is opened only for a required time period, and only a portion of the icons are always displayed in an area other than the icon display window.

A command area to command to open the icon display window may be provided at a portion of a periphery of the display screen. The command area is necessary when the command is entered by a pointing device but it is not always necessary when the command is entered by a keyboard.

The icon display window is preferably opened automatically when the data processing is started or other windows are not opened.

When the icon display window is open, it is desirable that a message to an operator is displayed in accordance with a current job status. The message may be, for example, OK or not OK of power turn-off.

The icons are preferably selectively pointed to by a plurality of input means, such as a keyboard and a mouse.

In a further aspect of the menu presentation method of the present invention, a menu is displayed by a plurality of icons and any of the icons is selected by a mouse cursor. The icons are displayed together with explanatory descriptions of jobs, an if one of the job description areas or the display areas is pointed to by the mouse cursor, it is accepted as the selection by the icon.

In yet another aspect of the menu presentation method of the present invention, a menu is presented by a plurality of icons together with corresponding job descriptions.

In yet another aspect of the menu presentation method of the present invention, a menu is displayed by a plurality of icons and any one of the icons can be selected by key entry. A key cursor for selecting one of the icons is displayed and it is moved by a key entry, such as a cursor key so that different icons are sequentially pointed to.

A data processing unit of the present invention for presenting a primary job menu of data processing by a plurality of icons displayed on a display screen comprises means for opening a menu window which displays the icons therein, means for displaying the icons and corresponding job descriptions of the icons in the menu window, means for commanding the opening of the menu window, and means for selecting one of the icons.

In the present data processing unit, it is preferable to further provide means for activating the means for opening the menu window when the data processing is started or when windows other than the menu window are not opened.

In another aspect of the data processing unit of the present invention, a plurality of icons selectable by a cursor are displayed on a display screen so that a primary job menu of data processing is presented by the icons means for displaying a menu window containing the icons at a major portion of the display screen for a required time period is provided, and a command area for opening the menu window is provided at a portion of the periphery of the display screen.

In still another aspect of the data processing unit of the present invention, a plurality of cursors selectable by a cursor are displayed on a display screen so that a primary job menu of data processing is presented. Means for displaying a menu window containing the icons at a major portion of the display screen for a required time period, and an area for continuously displaying selected ones of the icons is provided at a portion of the periphery of the display screen.

The data processing unit of the present invention for presenting a plurality of icons on a display screen as a primary job menu of data processing comprises menu window display means for displaying a menu window containing the icons, program discrimination means for identifying a program to be started in accordance with selected one of the icons, program start means for starting the program to be started, menu window erase means for erasing the display on the menu window after the icon has been selected, and means for activating the menu window display means when a program which uses a window other than the menu window is not activated.

In the present data processing unit, there are provided means for continuously displaying specific icons displayed in the menu window in another area on the screen, and icon control means for controlling the unit such that, when the specific icon is selected in one of the menu window and the other area, it is processed as being selected in the other too. In the present data processing unit or the data processing unit described above, means for checking a job status when the menu window is to be displayed and displaying a message in accordance with the status may be provided.

The data processing unit of the present invention for presenting a plurality of icons on a display screen as a menu of data processing comprises means for storing descriptive data of contents of jobs of the icons, and means for displaying the descriptive data together with the icon.

The data processing unit of the present invention for presenting a plurality of icons on a display screen comprises means for displaying a key cursor for selecting one of the icons, and means for updating the display position of the key cursor so that the displayed key cursor sequentially selects different icons.

In accordance with the present invention, a plurality of icons, particularly icons as a primary menu of data processing are displayed in one window (menu window), and the command area for opening the menu window only for required time period is provided so that the wide display area may be utilized for the text preparation work, and when the menu window is required, it is displayed at the center of the screen. Accordingly, not only the icons but also the descriptive texts of the contents of the jobs of the icons can be displayed in the menu window. Thus, the user can more readily understand the content of job and misoperation is prevented. When a program which uses a window other than the menu window is not active, the menu window is automatically displayed to facilitate the operation of the next step.

When a wide area menu window is displayed, other windows already displayed may be hidden behind so that the power may be inadvertently turned off during the operation. This problem, however, may be resolved by examining the current job status by detecting the windows which are now open and displaying an appropriate message to a user in accordance with the examined status.

For those icons which are frequently used or used for relatively urgent jobs, a separate icon area is provided so that those icons are continuously displayed therein. Thus, the icon may be directly selected without displaying the menu window, and the work efficiency is improved. Since the number of those icons is limited, the problem of reduction of the display area due to those icons is minor.

The icons may be selected by the pointing device such as mouse or by the keyboard as well. Thus, the operator may choose whichever he/she likes. It is not necessary to grip the mouse while the operator is manipulating the keyboard, and the misoperation is reduced by the usual pointing by the key cursor.

BRIEF DESCRIPTION OF THE DRAWINGS

FIG. 2B shows a display screen having characters displayed in a work area,

FIG. 14 shows an icon table and a separate icon table.

DESCRIPTION OF THE PREFERRED EMBODIMENTS

An embodiment of the present invention which is applied to a Japanese word processor is now explained.

Figure 1A:
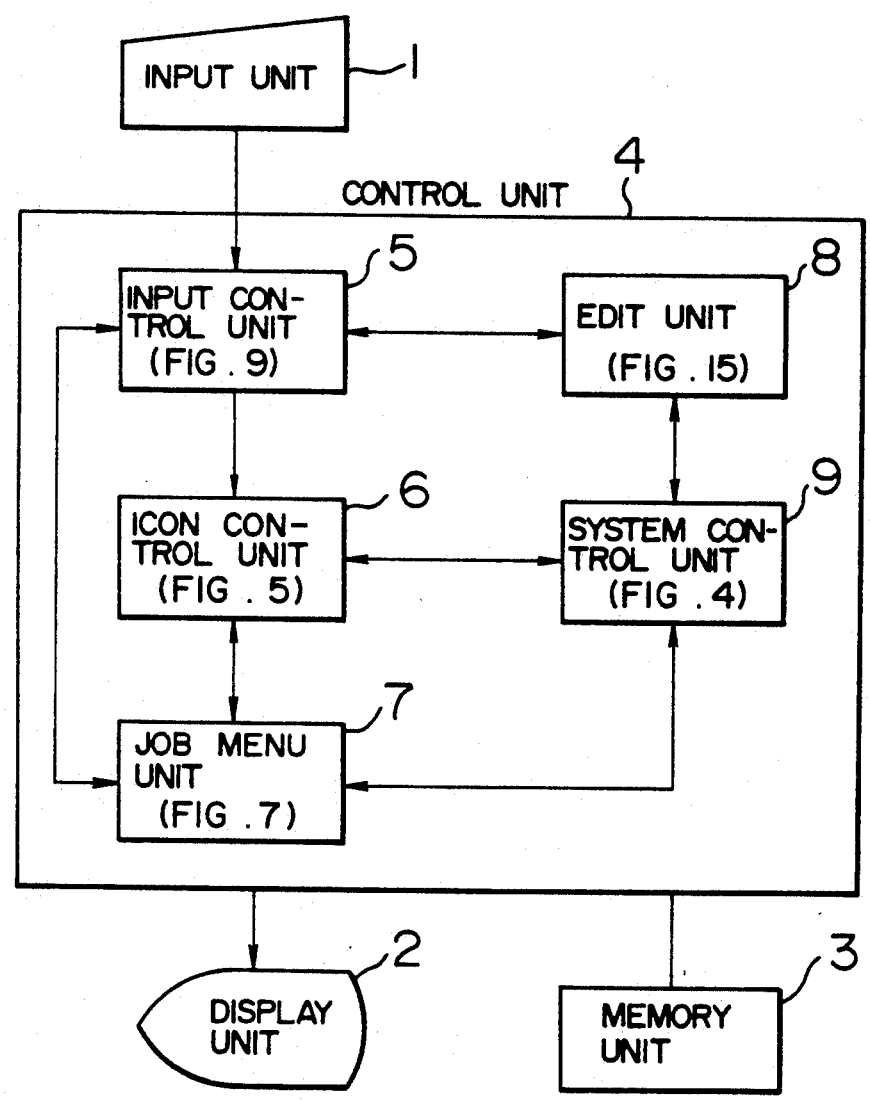
FIG. 1A is a block diagram of a data processing unit of the present invention.

FIG. 1A shows a configuration of a word processor in accordance with the present invention. Numeral 1 denotes an input unit including a keyboard for entering characters or a pointing device such as a mouse for pointing to an object or other input device, numeral 2 denotes a display unit such as a CRT display, numeral 3 denotes a memory unit such as semiconductor memory or magnetic memory, in which a prepared text is stored, and numeral 4 denotes a control unit such as a microprocessor for controlling the above units and comprises an input control unit 5, an icon control unit 6, a job menu unit 7, an edit unit 8 and a system control unit 9. In the present embodiment, the text is prepared and edited by the edit unit 8.

Figure 1B:
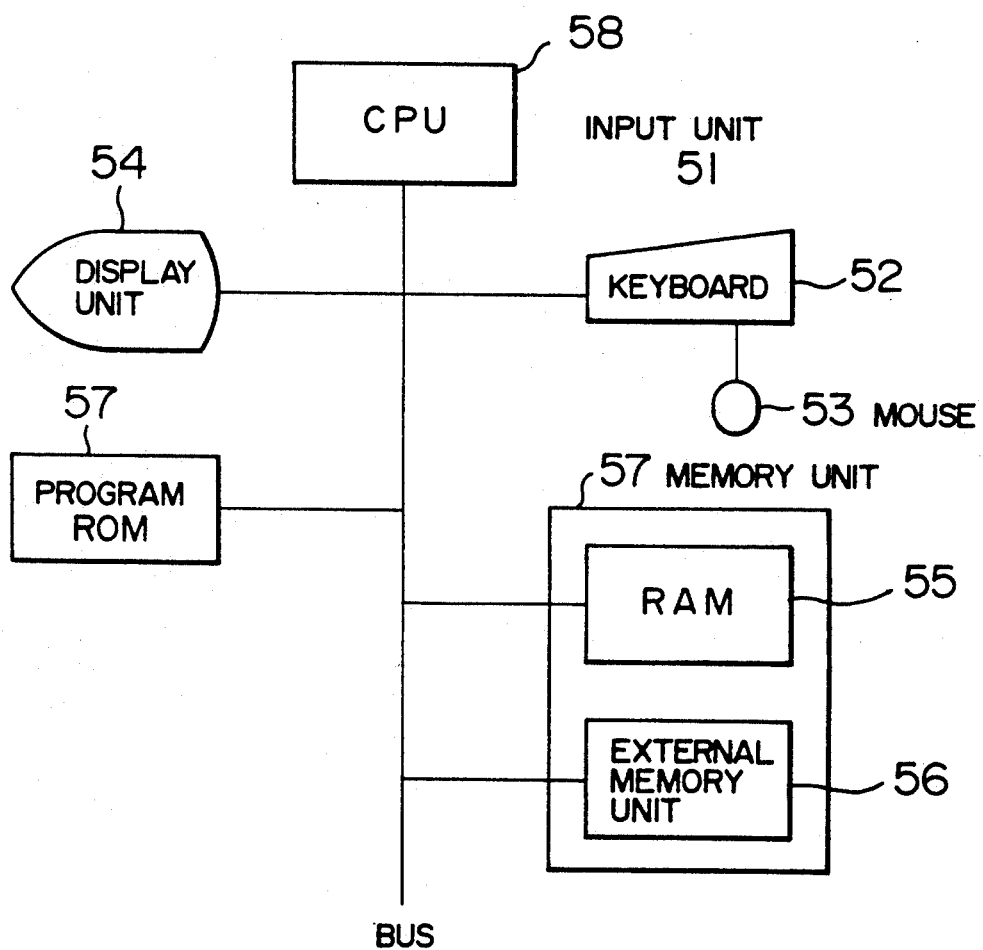
FIG. 1B is a block diagram of a data processing unit of the present invention.

FIG. 1A shows a functional block diagram while FIG. 1B shows a configurational block diagram. The word processor shown in FIG. 1B comprises a keyboard 52 for entering characters, an input unit 51 having a mouse 53 for pointing to an object, a display unit 54 having a CRT display for displaying characters and graphics, and an external memory unit 56 such as semiconductor memory 55 or magnetic memory for storing a prepared text. The word processor of FIG. 1B further comprises a program 57 to be used to operate the system and a processor CPU 58 for controlling the respective units.

Figure 2A:
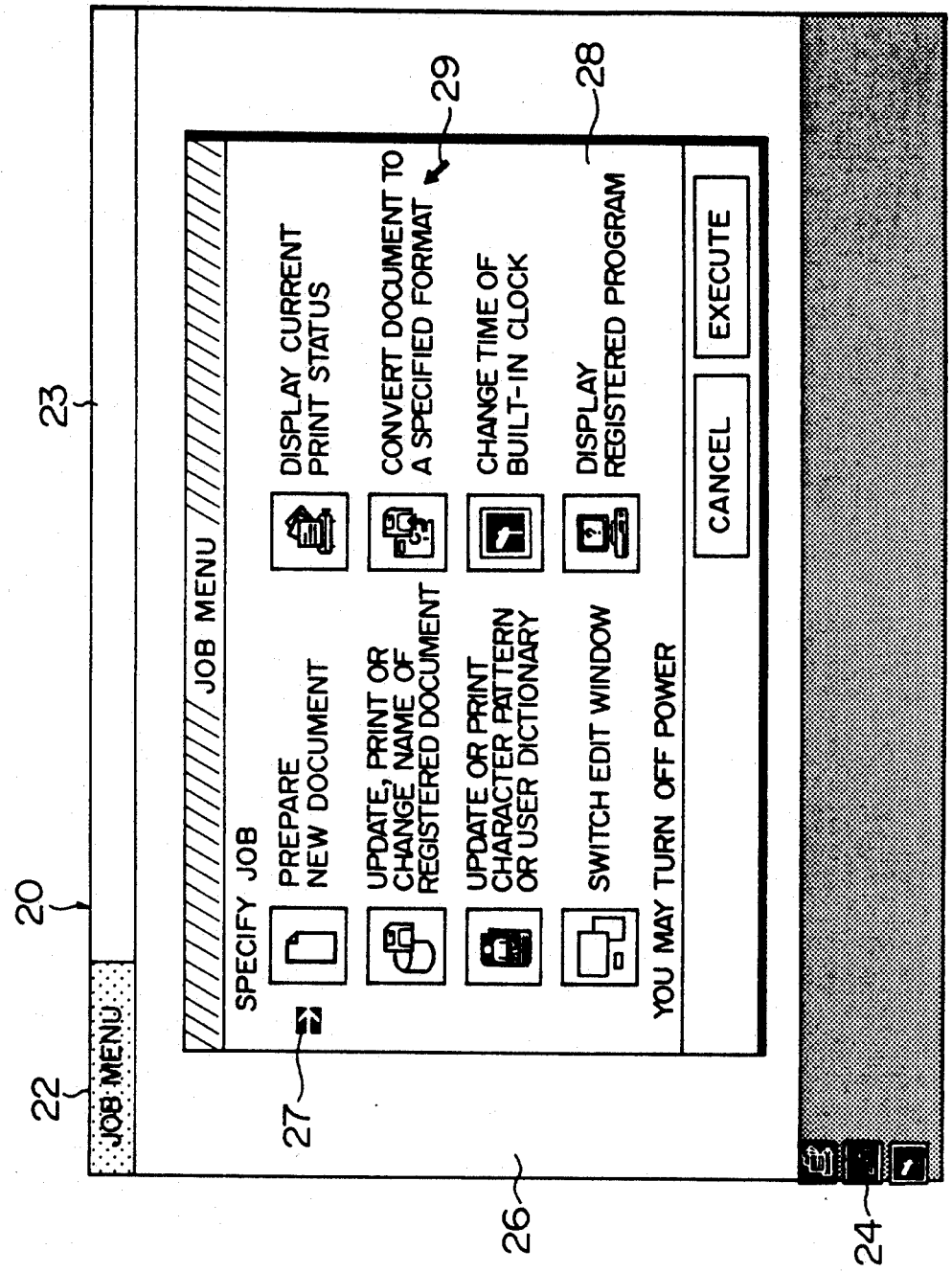
FIG. 2A shows an example of display screen on a display unit.

FIG. 2A shows an example of a screen displayed on the display unit 2. The screen 20 comprises a job menu area 22 for commanding the display of a job menu window 28 which includes icons of a primary job menu, a separate icon area 24 for directly activating the edit unit 8, an edit area 26, and a menu area 23 for displaying a secondary menu corresponding to the activated edit program. A right hand space area of the separate icon area 24 is used as a work area or guidance area in a text preparation mode. The edit programs in the edit unit 8 operate to display data in the respective rectangular frames (hereinafter called edit windows) in the edit area 26 and to edit the text data in the edit window 32. The edit window 32 is shown in FIG. 2B.

Picture characters (hereinafter called icons) which represent the edition programs of the edition unit 8 are displayed in the separate icon area 24. When an icon is selected by an operator, the corresponding edit program is started. The icons which represent the edit programs and brief descriptions of the contents of the edit programs are displayed in the job menu window 28.

Figure 3:
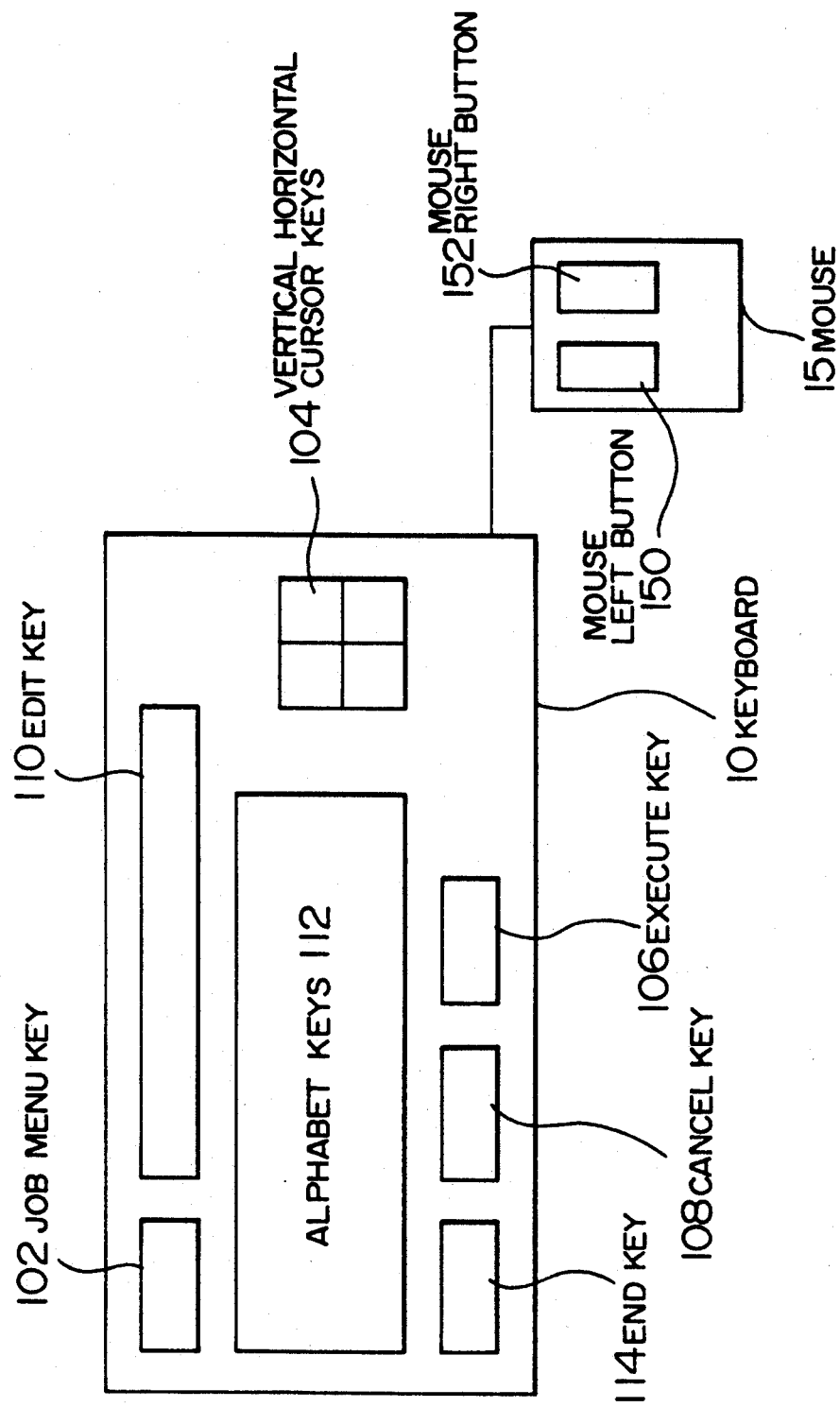
FIG. 3 shows a configuration of an input unit.

FIG. 3 show a configuration of the input unit 1. In the present embodiment, it includes a keyboard 10 for commanding a job by a key and a mouse 15 for directly commanding a job on the screen 20 displayed on the display unit 2. The keyboard 10 comprises a job menu key 102 for commanding the display of the job menu window shown in FIG. 2A, vertical and horizontal cursor keys 104 for selecting an icon in the job menu window, an execution key 106 for starting the edit program corresponding to the selected icon, a cancel key 108 for cancelling the display when the job menu window 28 is displayed in error, an edit key 110 for edit, JIS alphabet keys 112 for entering characters, and an end key 114 for terminating the edit program. As shown in FIG. 3, the mouse 15 comprises an execution button 150 (hereinafter called a mouse left button) for selecting the object or function, and a cancellation button 152 (hereinafter called a mouse right button) for cancelling the selected object. The mouse cursor 29 shown in FIG. 2A is moved on the screen 20 to follow the movement of the mouse 15 by the operator, and it is used to point to an object on the screen 20. In the input device shown in FIG. 3, the arrangement of the keys, the number of keys and the positions of the keys are not specified. Any other input device which can attain the function of the present embodiment may be used.

The control unit 4 is now explained in detail.

Figure 4:
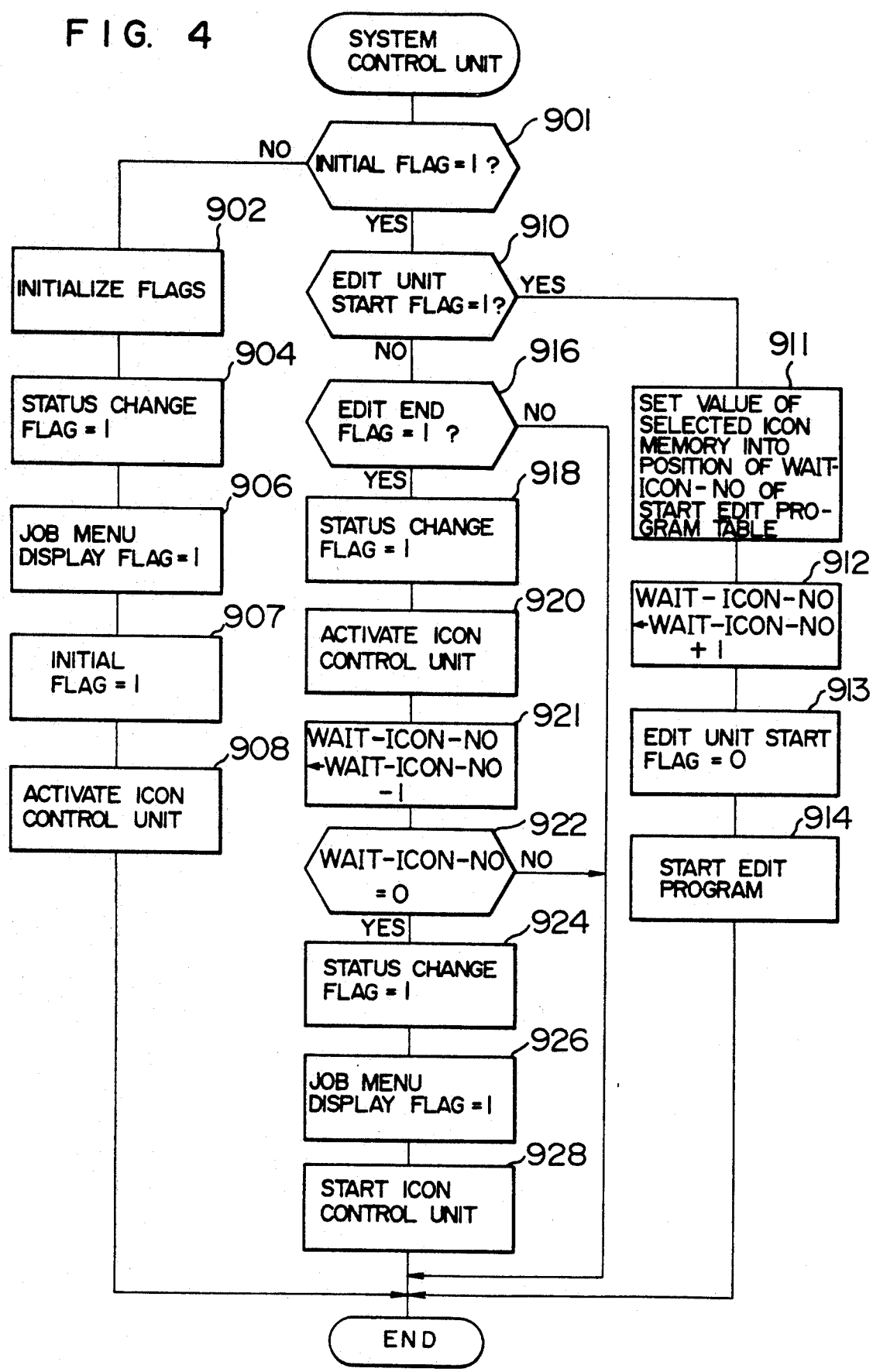
FIG. 4 is a flow chart showing an operation of a system control unit.
Figure 5:
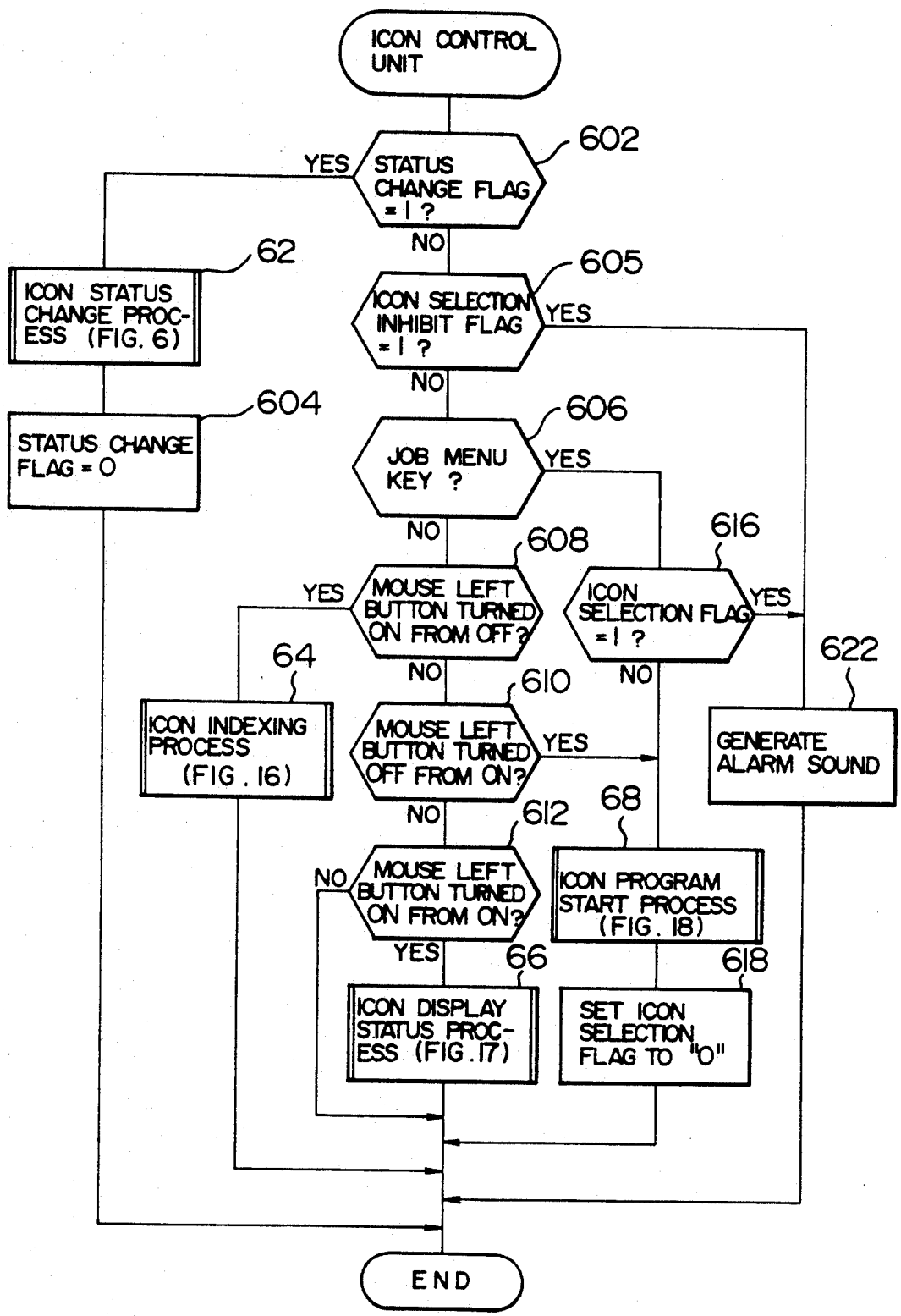
FIG. 5 is a flow chart showing an operation of an icon control unit.
Figure 7:
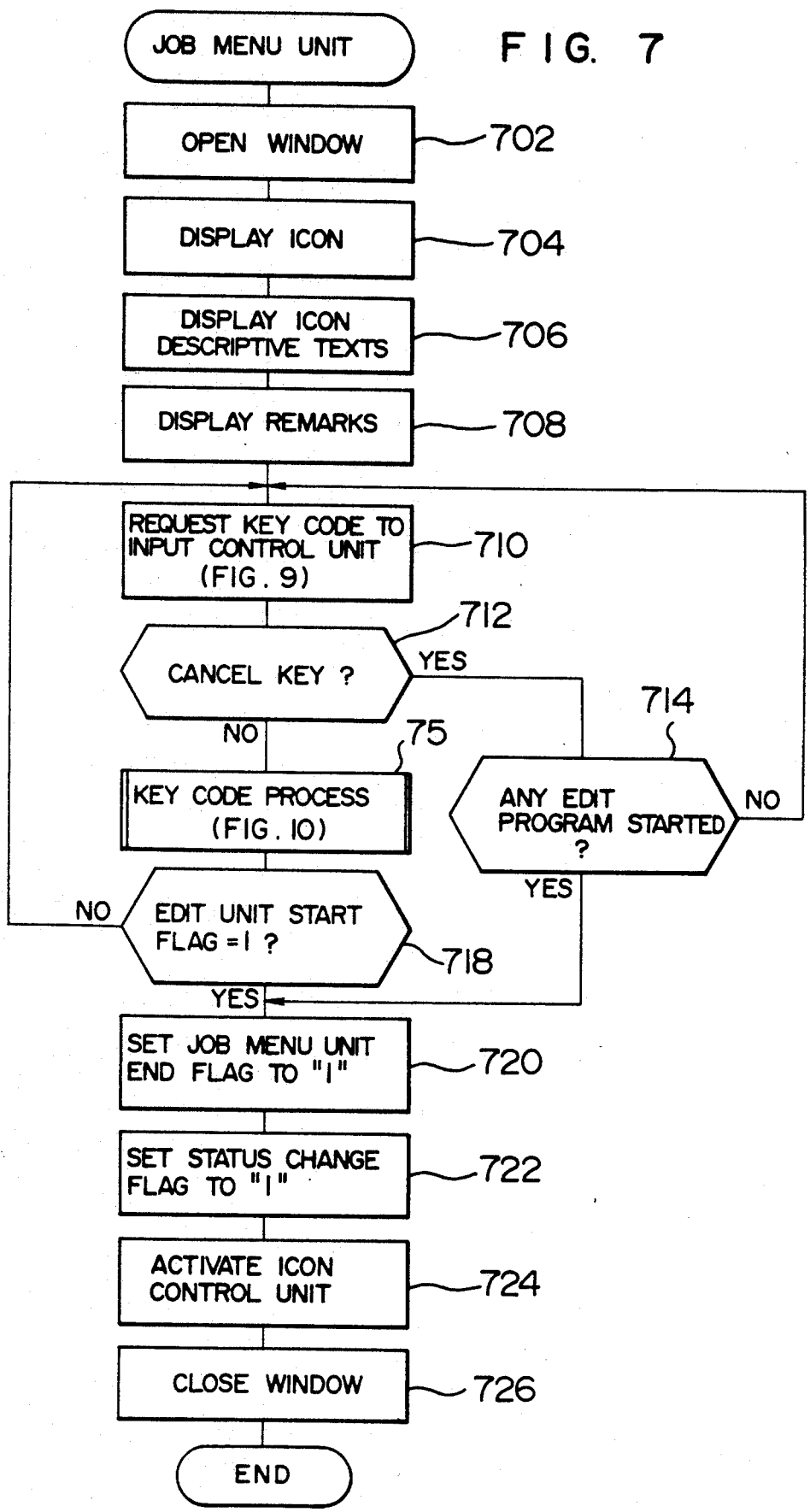
FIG. 7 is a flow chart showing an operation of a job menu unit.
Figure 9:
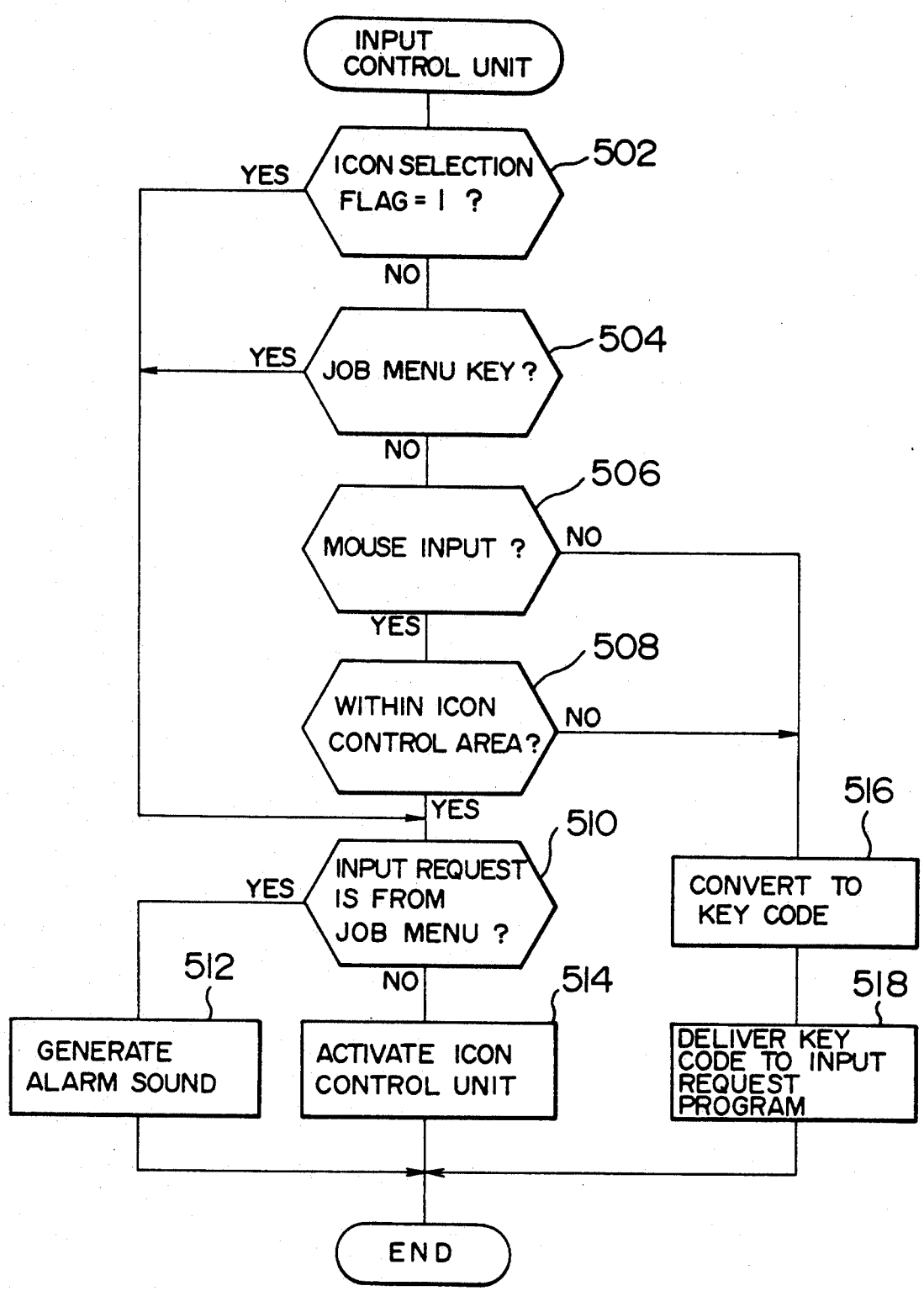
FIG. 9 is a flow chart showing an operation of an input control unit.
Figure 15:
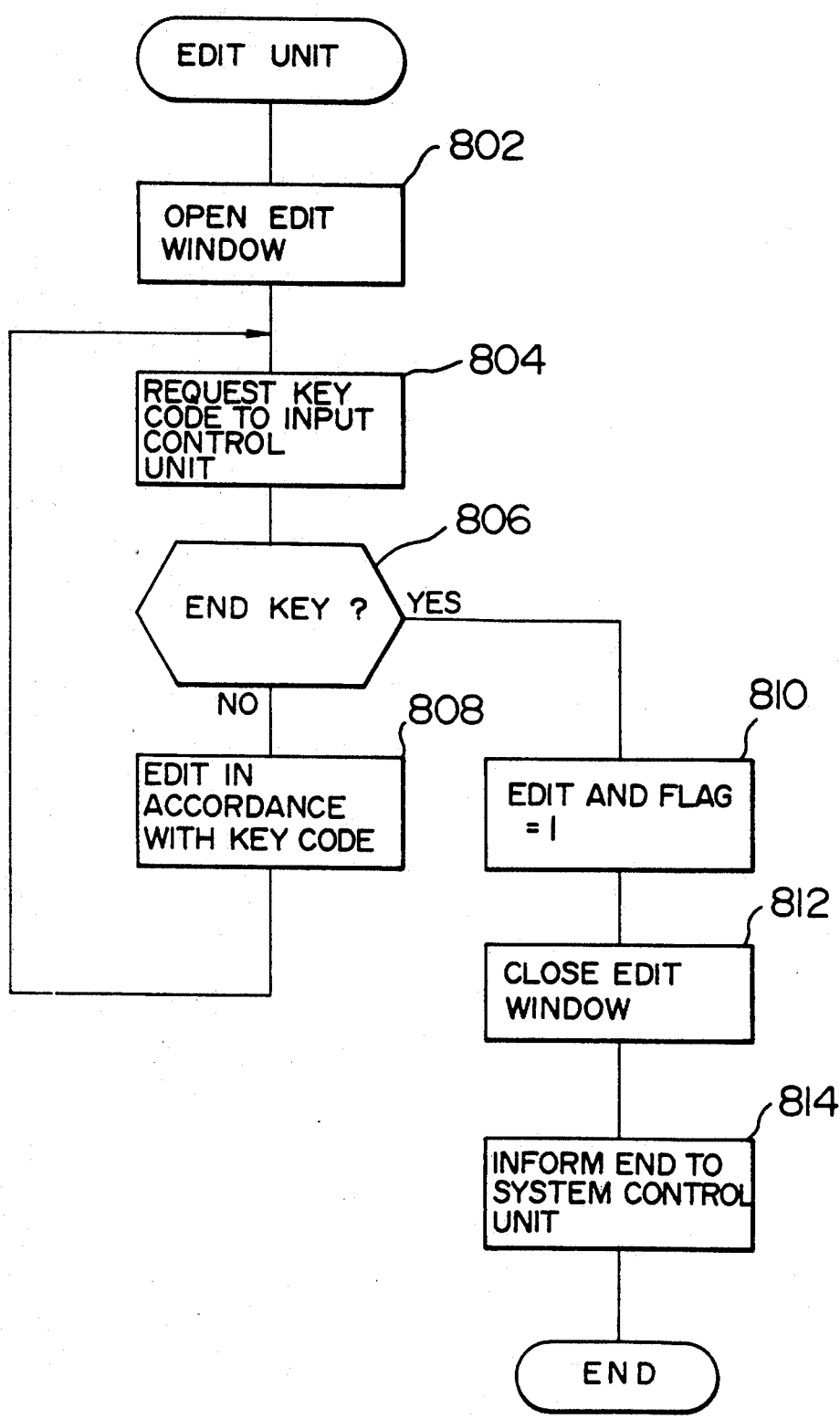
FIG. 15 is a flow chart showing an operation of an edition unit.

FIG. 4 is a flow chart showing the operation of the system control unit 9, FIG. 5 is a flow chart showing the operation of the icon control unit 6, FIG. 7 is a flow chart showing the operation of the job menu unit 7, FIG. 9 is a flow chart showing the operation of the input control unit 5, and FIG. 15 is a flow chart showing the operation of the edit unit 8. The flow of process is now explained.

When power is turned on, the system control unit 9 is first activated.

In a step 901 of FIG. 4, whether an initial flag is "1" or not is determined. The initial flag is used to determine whether the system initialization is required or not. If it is "0", the initialization is required, and if it is "1", it is not required. At the turn-on of the power, it is set to "0". In a step 902, variables including flags used in the system are initialized. In the present embodiment, an icon select flag, an edit unit activation flag and a WAIT ICON NO are set to "0". The icon select flag is a variable which determines whether an icon in the job menu area 22 or the separate icon area 24 in FIG. 2A is being pointed to by the mouse 15 of FIG. 3. When it is "0", it indicates that the icon is not pointed to, and when it is "1", it indicates that the icon is being pointed to. The edit unit activation flag is a variable which determines whether the edit program in the edit unit is to be started or not. When it is "1", the program is started, and when it is "0", the program is not started. The WAIT ICON NO is a memory (variable) which controls the number of started edit programs.

Next, in order to display the job menu window, a status change flag is set to "1" in a step 904, a job menu display flag is set to "1" in a step 906, an initial status flag is set to "1" in a step 907, and the icon control unit 6 is activated (908). The status change flag is a variable used to change the activation status of the icon. When it is "0", it means no change of the status, and when it is "1", it means the change is to be done. The job menu display flag is a variable for controlling the display of the job menu window. When it is "0", it means that the job menu window is not displayed, and when it is "1", it means that the job menu window is displayed.

Figure 6:
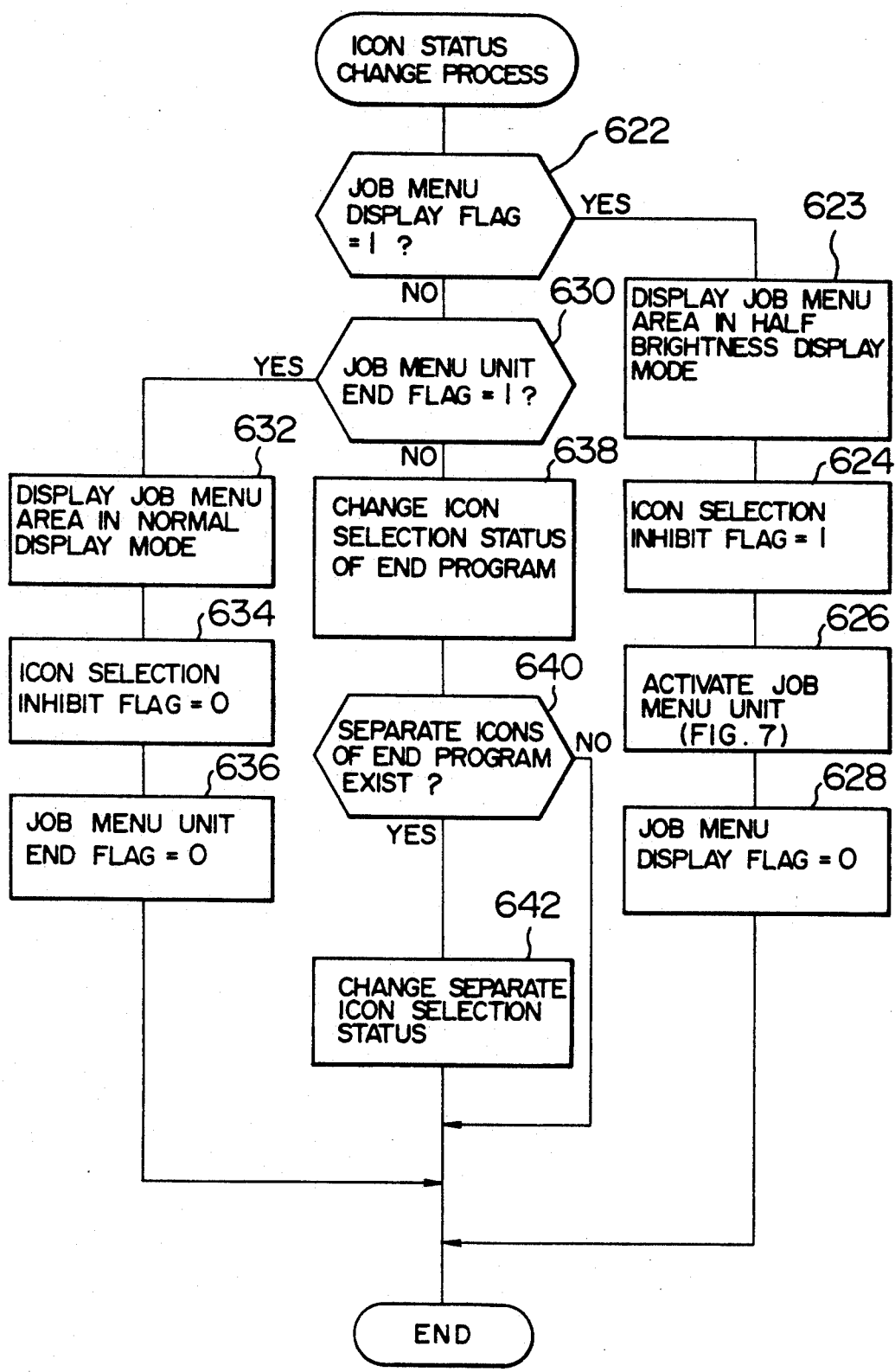
FIG. 6 is a flow chart showing an operation of an icon status change process.

The activated icon control unit 6 activates the icon status change process (62) because the status change flag is "1" as shown in a step 602 of FIG. 5. FIG. 6 is a flow chart showing the operation of the icon status change process 62. In a step 622, whether the job menu display flag is "1" or not is determined. When the power is turned on, "1" is set in the step 906. Therefore, in a step 623, the job menu area 22 is set to a half-brightness display mode as shown in FIG. 2A, and an icon selection inhibit flag is set to "1" in a step 624. As a result, if the job menu window 28 is open, the icons in the job menu area 22 and the separate icon area 24 are inhibited from being pointed to. When the icon selection inhibit flag is "0", the icons in the job menu area 22 and the separate icon area 24 can be pointed to. In a step 626, the job menu unit 7 is activated, and in a step 628, the job menu display flag is set to "0".

As shown in FIG. 7, the activated job menu unit 7 opens the job menu window for displaying the primary job menu as shown in FIG. 2A, according to step 702 of FIG. 7. In a step 704, the icons and the icon pointing key cursor 27 are displayed, the descriptive texts of the icons are displayed in a step 706, and a remark to the current system status is displayed in a step 708. The descriptive texts for the icons are picked up by an icon descriptive text pointer for an icon table shown in FIG. 14 and they are displayed together with the icons as shown in FIG. 2A. The contents of the texts relate to the contents of the editing operations to be executed when the icons are selected. By describing the contents of the jobs of the icons, the chance of misoperation is reduced and the efficiency of the work is improved.

Figure 2C:
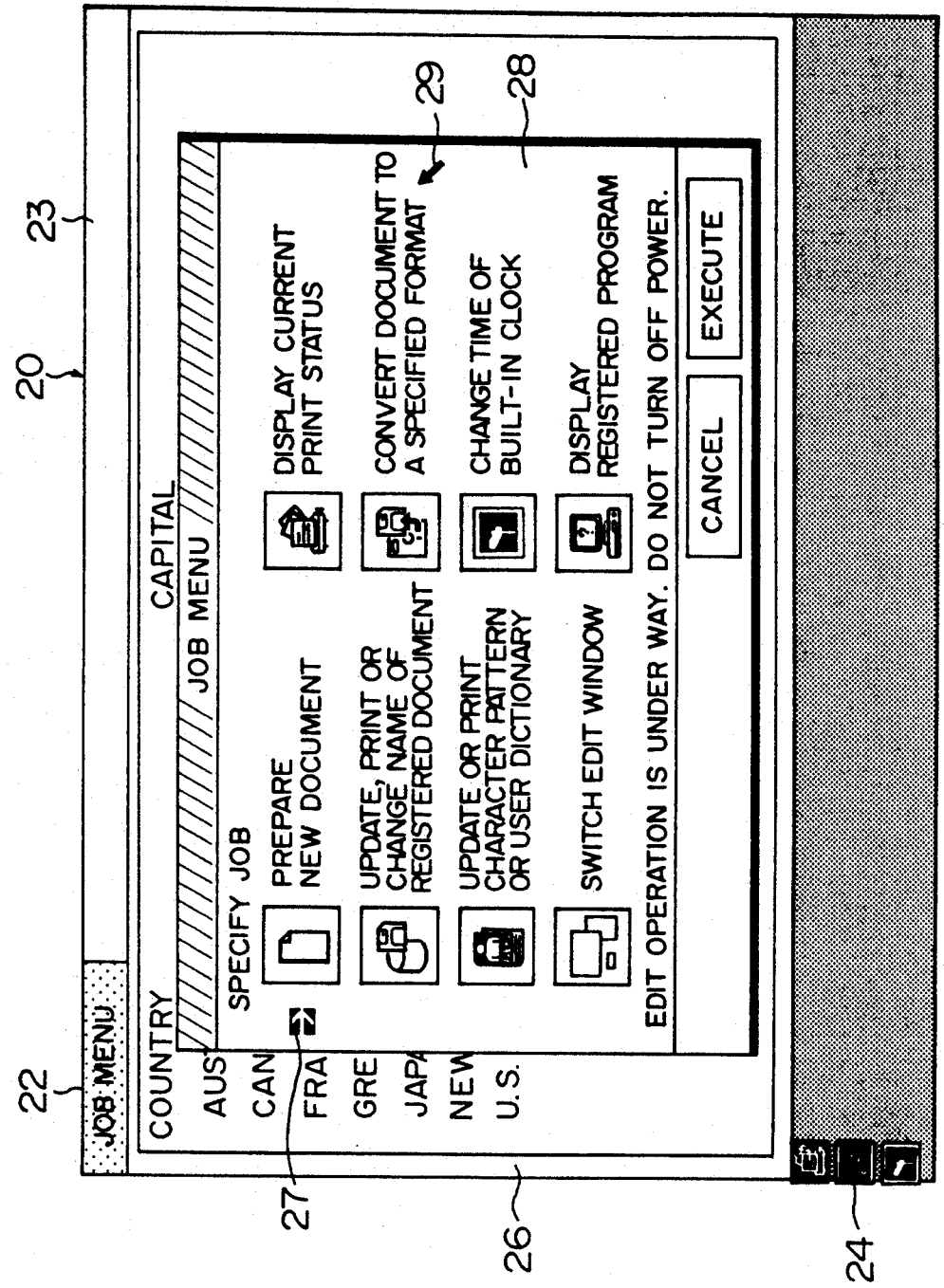
FIG. 2C shows a display screen having a job menu window opened in the display screen of FIG. 2B.

The open and close operations for the job menu window 28 of FIG. 7 are now explained. The opening of the job menu window 28 means to set the job menu window 28 at a portion of the work area 26 of FIG. 2A. Nothing is displayed in the work area 26 of FIG. 2A. If the job menu window 28 is set while characters are displayed on the edit window 32 as shown in FIG. 2B, the display screen shown in FIG. 2C is produced. The closing of the job menu window 28 means to return to the display status of FIG. 2B from the display status of FIG. 2C, for example. The setting of the job menu window 28 in the edit window 32 has been explained. Further, the job menu window 28 may be set on display modes other than the edit window 32.

Figure 8:
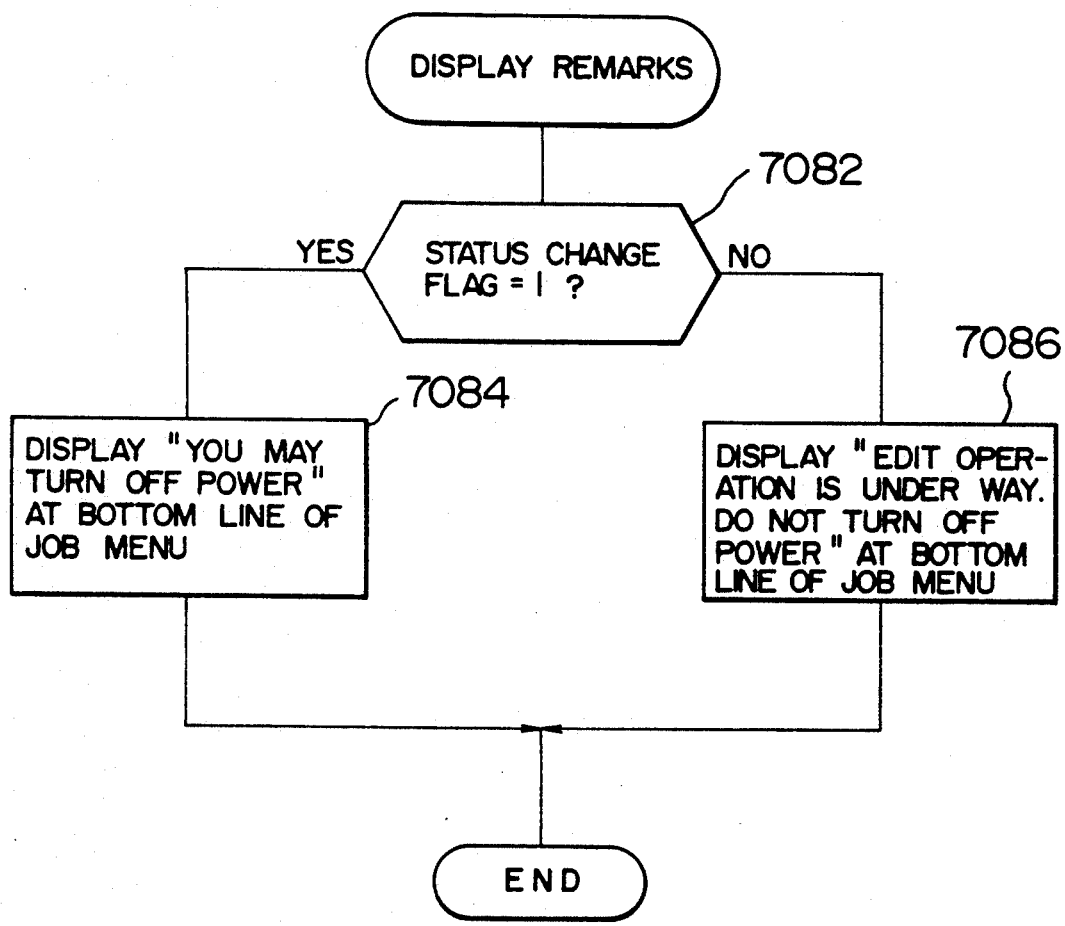
FIG. 8 is a flow chart showing an operation of a remark display process.

The operation for the remark is shown in FIG. 8. In a step 7082, whether the status change flag is "1" or not is determined. In the present embodiment, if it is "1", it means that there is no window other than the job menu window. Thus, in a step 7084, a remark (message) "Power may be turned off" is displayed at a bottom line in the job menu window of FIG. 2. The remark is changed in accordance with the edit status in the system because the window 32 of the edit program which has already been opened may be hidden by opening the job menu window 28 and it may not be clear for the user whether the power may be turned off or not, or where the program is started without opening the window such as an edit program for printing, it is necessary to prevent the user from inadvertently turning off the power. By displaying the remark, the user may determine whether the power may be turned off or not. After the job menu window has been displayed, the process returns to the step 710 of FIG. 7 to request a key code to the input control unit 5.

The input control unit 5 is activated when the key code is requested by the job menu window 28 or the edit unit 8 and the user commands through the input unit 1. As shown in FIG. 9, the input control unit 5 activated in the step 710 checks the icon selection flag in a step 502, which determines whether the mouse 15 points to the job menu area 22 or the separate icon area 24 of FIG. 2. When the power was turned on, it was set to "0" in the step 902 (FIG. 4). Accordingly, the process proceeds to a step 504. In the step 504, whether the user has depressed the job menu key 102 (FIG. 3) or not is determined. If the job menu key 102 has been depressed, whether the input request was made to the job menu unit 7 or the edit unit 8 is determined in a step 510. If it is a request to the job menu unit 7, a sound is generated in a step 512. If it is a request to the edit unit 8, the icon control unit 6 is activated in a step 514. If the job menu key 102 has not been depressed, whether the user input is from the keyboard 10 or the mouse 15 is determined in a step 506. If it is from the keyboard, it is converted to a key code in a step 516, and the key code is delivered to an activation program for the input request unit, that is, the job menu unit 7 or the edit unit 8, in a step 518. In the step 506, if the user input is from the mouse 15, whether the position of the mouse cursor 29 is in the job menu area 22 or the separate icon area 24 or not is determined in a step 508. If it is in the area 22 or 24, the input request unit is examined in a step 510. If it is outside the area, the key code is delivered to the input control unit 5 through steps 516 and 518.

Turning back to FIG. 7, when the request has been made to the input control unit 5 in the step 710, the input information entered by the user through the keyboard or the mouse of FIG. 3 is converted to a key code, which is then delivered in the step 710. For example, if the user has depressed the cancel key 108 of FIG. 3, the input control unit 5 delivers the key code of the cancel key. In a step 712, whether the key code represents the cancel key or not is determined, and if it represents the cancel key, whether the edit program has been started or not is determined in a step 714. This determination is made to display the job menu window 28 if the edit program has not been started in order to increase the work efficiency of the user. In order to determine whether the edit program has been started or not, the WAIT ICON NO is checked. If it is "0", it means that no edit program has been started. If the edit program has not been started in the step 714, the process proceeds to the step 710, and if the edit program has been started, the process proceeds to a step 720 to set the job menu unit end flag to "1", and the status change flag is set to "1" in a step 722. In a step 724, the icon control unit 6 is activated, and in a step 726 the job menu window 28 is closed. If the user depresses a key other than the cancel key in the step 710, the key code is processed in the step 75.

Figure 10:
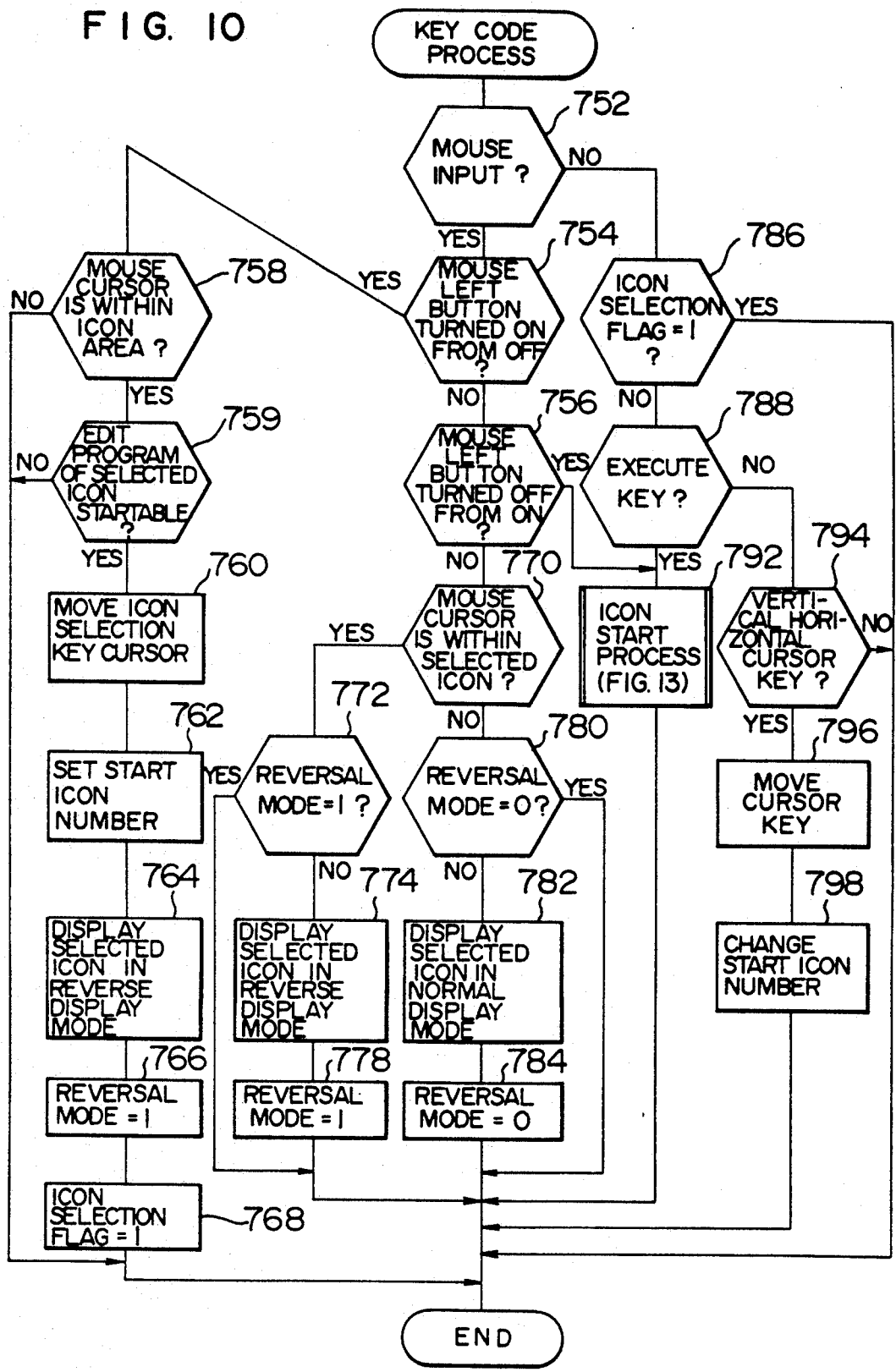
FIG. 10 is a flow chart showing an operation of a key code process.
Figure 11:
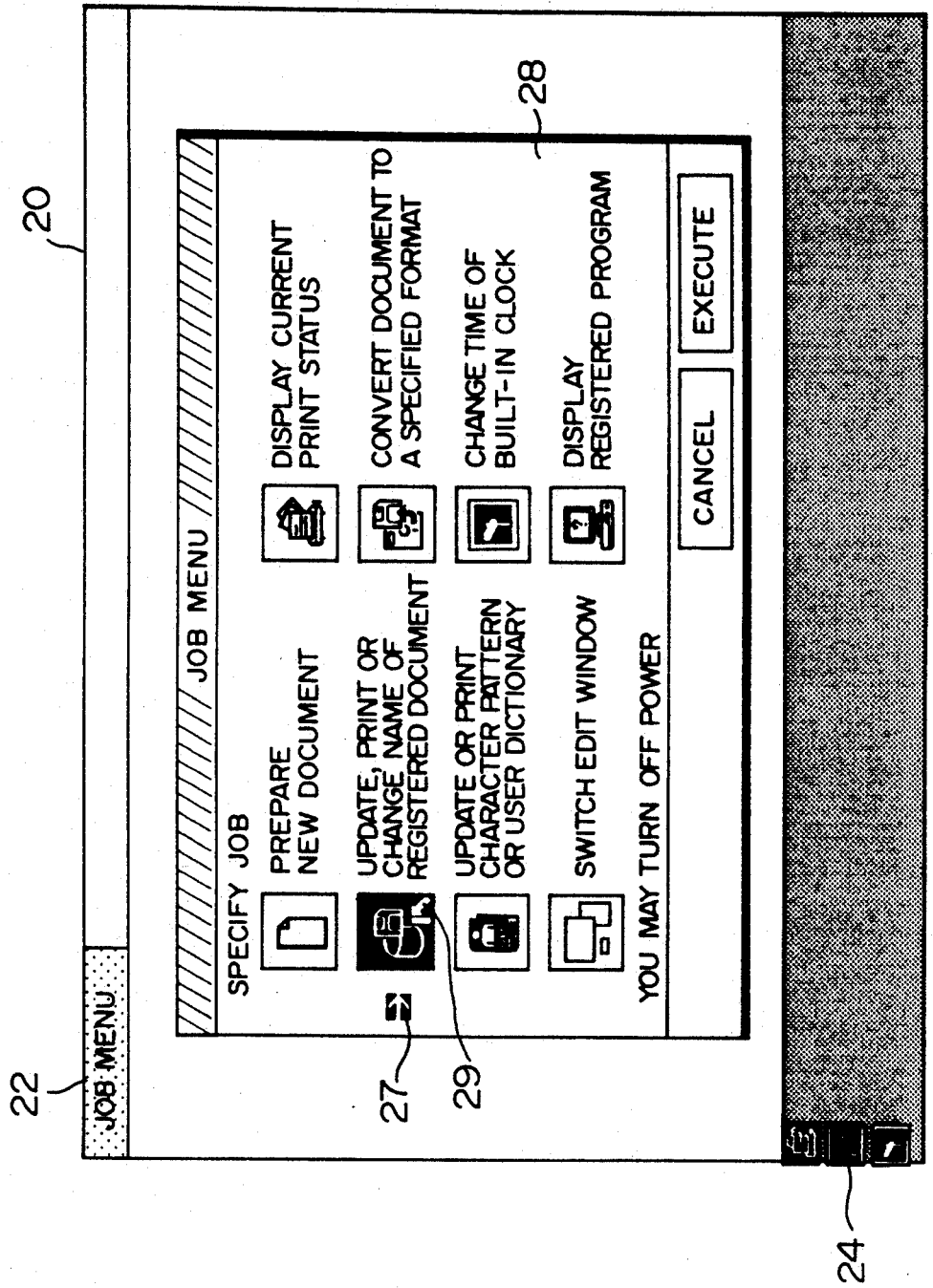
FIG. 11 shows an example of display screen on a display unit.
Figure 12:
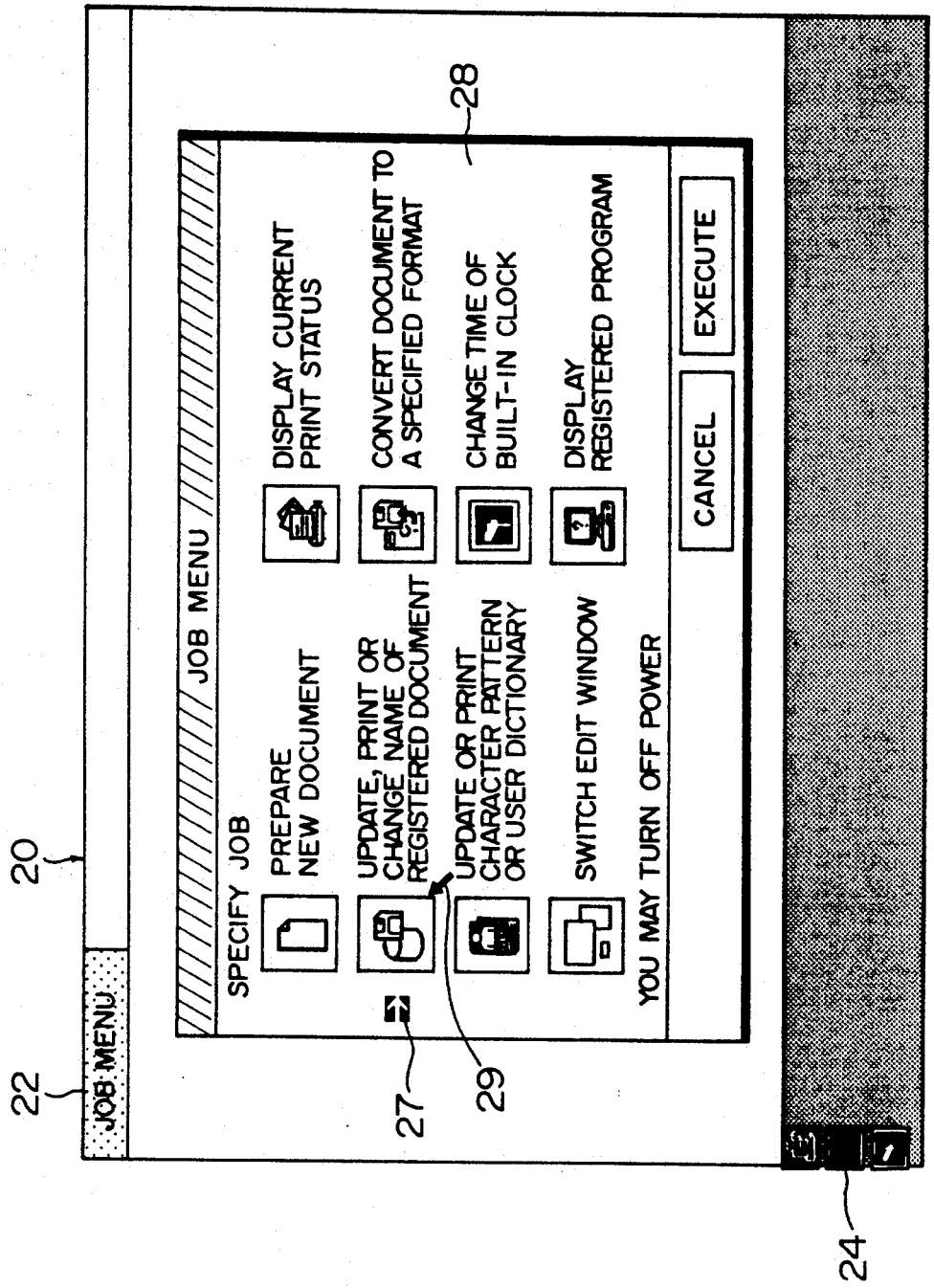
FIG. 12 shows an example of display screen on a display unit.

FIG. 10 is a flow chart showing the operation of the key code process 75. In a step 752, whether the user input is from the mouse or keyboard is determined. If it is from the mouse, the status of the mouse left button is determined in steps 754 and 756. If the user has depressed the mouse left button 150 from an OFF position to an ON position, whether the position of the mouse cursor 29 is within the area of the icons in the job menu window shown in FIG. 11 or not is determined. If it is not within the icon area, the key code process is terminated. If it is within the icon area, whether the edit program corresponding to the selected icon (the icon pointed to by the mouse cursor) has already been started or not is determined in a step 759. In the determination, a start status area of FIG. 14 is referenced. If it has not been started, the icon pointing key cursor 27 is moved to the position of the selected icon in a step 760. In a step 762, the icon number is set into the start icon number. The icon numbers are previously assigned as 1, 2, 3 and 4 from the left top to the bottom and as 5, 6, 7 and 8 from the right top to the bottom, as shown in FIG. 11. In FIG. 11, "2" is set into the start icon number. In a step 764, the selected icon is reversed in intensity to emphasize the selected object to the user, as shown in FIG. 11. In a step 766, the reversal mode is set to "1". The reversal mode is to determine whether the icon is displayed reversed in intensity. If it is "1", it means the reversal state, and if it is "0", it means the non-reversal state (hereinafter called a normal display state). In a step 768, the icon pointing flag is set to "1" and the key code process is terminated. The icon pointing flag serves to determine whether the icon has been selected by the user or not. If it is "1", it means that the icon has been selected, and if it is "0", it means that the icon has not been selected. FIG. 11 shows the display status where the user has moved the mouse cursor 29 to the second icon counted from the left top icon in the job menu window 28 using the mouse 15, and has depressed the mouse left button. If the user moves the mouse 15 while he/she depresses the mouse left button (ON-state), whether the mouse cursor 29 is within the area of the selected icon or not is determined in a step 770. If it is not within the area of the selected icon, whether the reversal mode is "0" or not is determined in a step 780. If the reversal mode is "1", the selected icon is displayed in the normal mode in a step 782, as shown in FIG. 12. In a step 784, the reversal mode is set to "0". In a step 770, when the mouse cursor is within the area of the selected icon, whether the reversal mode is "1" or not is determined in a step 772. If the reversal mode is "0", the selected icon is again reversed in intensity in a step 774 as shown in FIG. 11. In a step 778, the reversal mode is set to "1". If the mouse left button is released (OFF-state), the icon start process is initiated in a step 792. In the present embodiment, the selection of the icon by the mouse is determined by whether the mouse cursor 29 is within the area of the icon or not. Alternatively, the determination may be made based on the icon area and the area of the corresponding descriptive text so that the selection of the icon is detected when the descriptive text is pointed to.

If the input is from the keyboard in the step 752, whether the icon pointing flag is "1" or not is determined in a step 786. If the icon pointing flag is "1", it means that the input from the mouse is on the way. Accordingly, if it is "1", the key code process is terminated. If it is "0", whether the input key is the execution key or not is determined in a step 788. If it is the execution key, the icon start process is initiated in a step 792. If it is not the execution key, whether it is a vertical/horizontal key 104 or not is determined in a step 794. If it is a vertical/horizontal key, the type of key is examined in a step 796, and the icon pointing key cursor 27 is moved. If it is an up key, the cursor 27 is moved to the position of the icon number which is one less than the start icon number. However, if the start icon number is "1", the cursor 27 is moved to the position of the icon number "8". If it is a down key, the cursor is moved to the position of the icon number which is one larger than the start icon number. If it is a right key, the cursor is moved helically in the order of the icon numbers 1, 5, 2, 6, 3, 7, 4, 8, 1, and if it is a left key, the cursor is moved in the order of the icon numbers 1, 8, 4, 7, 3, 6, 2, 5, 1. In this manner, the start icon number is changed to correspond to the icon pointed to by the key cursor 27 (step 798).

Figure 13:
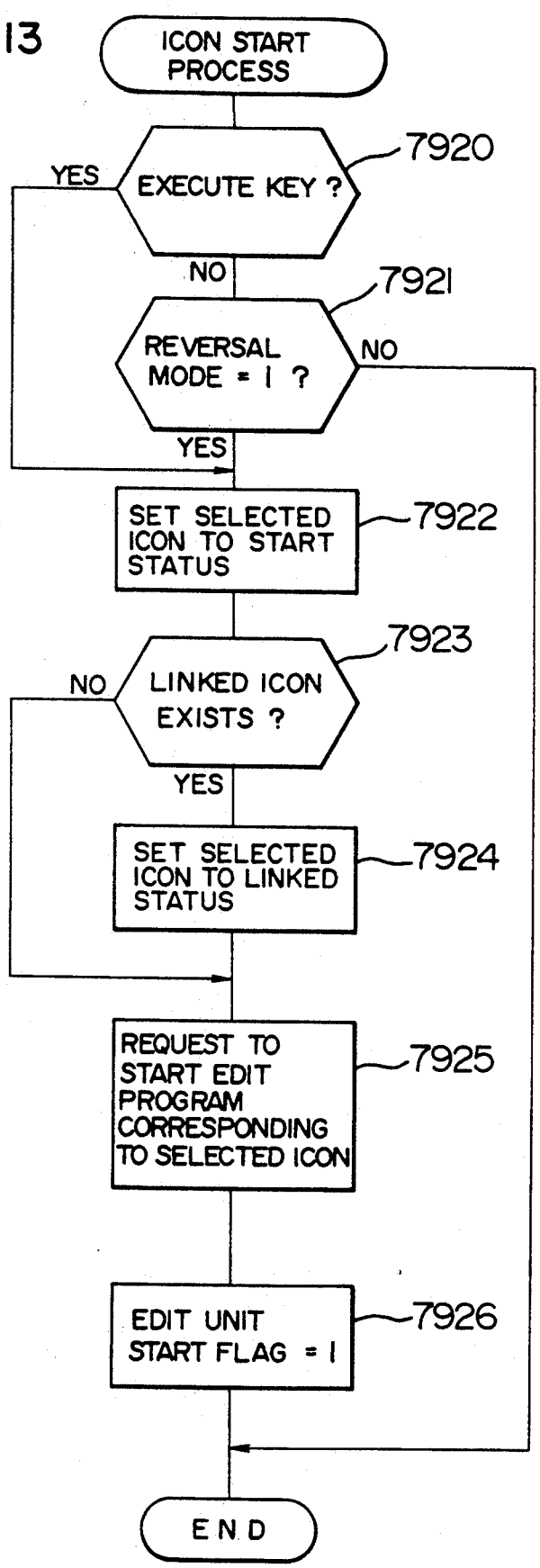
FIG. 13 is a flow chart showing an operation of an icon activation process.

FIG. 13 is a flow chart showing the operation of the icon start process 792. In steps 7920 and 7921, whether the selected icon is to be started or not is determined. If it is to be started, the icon designated by the start icon number is started in a step 7922. Each icon is managed by a table shown in FIG. 14. The table includes a table (hereinafter called an icon table) for managing the icons in the job menu window, and a table (hereinafter called a separate icon table) for managing the icons in the separate icon area 24 at the left bottom of FIG. 2. It has six management information, that is, start status, presence or absence of linked icons, linked icon numbers, start program number, pointer to icon descriptive text and icon descriptive text. The start status manages whether the edit program of the edit unit 8 for the icon has been started or not. If it is "1", it means that the program has been started, and if it is "0", it means that the program has not been started. The presence or absence of the linked icons manages whether the icons exist in both the job menu window and the separate icon area, or exist only in the job menu window. The presence of the linked icons indicates the icons which exist in both areas, and the absence of the linked icons indicates the icon which exists only in the job menu window. The linked icon numbers contain the icon numbers of the tables so that where the icon in one table is located in another table can be determined. The start program number contains the program number to be started by the edit unit 8 when the icon is selected by the user. The pointer to the icon descriptive text stores the pointer of the area in which the explanatory text for the content of the function of the work is stored when the job menu window 28 is displayed. The icon descriptive text stores data to be displayed in the job menu window 28.

Turning back to FIG. 13, in a step 7922, "1" is set into the area of the start status of the icon designated by the start icon number on the icon table. In a step 7923, whether the icon exists as a separate icon or not is determined by the area of the presence or absence of the linked icons. If the linked icons exist, "1" is set into the area of the start status of the separate icon table based on the linked icon numbers. In a step 7925, the start program number is obtained from the icon table and the start of the program is requested to the system control unit 9. In a step 7926, the edit unit start flag is set to "1".

Turning back to FIG. 7, when the start of the edit unit 8 is requested in the step 75, the edit unit start flag is set to "1". Thus, the job menu window 28 is closed in a step 726 through steps 718, 720, 722 and 724. In the step 724, the step 62 is initiated through the step 602 shown in FIG. 5, and the step 630 is initiated through the step 622 shown in FIG. 6. Since the job menu unit end flag is "1" in the step 630, the job menu area 22 is returned to the normal display mode from the half-intensity display mode in a step 632. In a step 634, the icon selection inhibit flag is set to "0", and in a step 636, the job menu unit end flag is set to "0" to render the job menu area 22 and the separate icon area 24 to be ready for selection.

Figure 19:
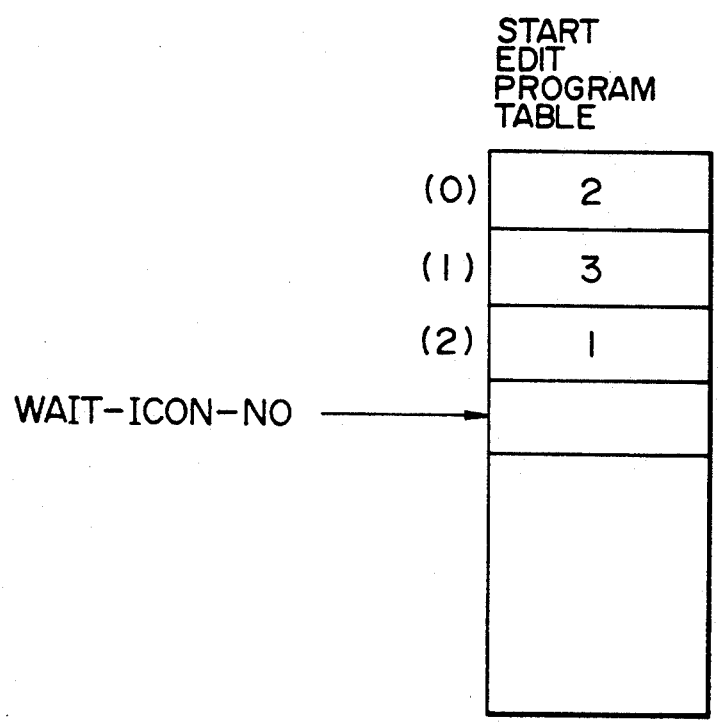
FIG. 19 shows a start edition program table.

Turning back to FIG. 4, when the system control unit 9 receives the start request for the program, it sets the value of the selected icon memory to the position of the WAIT ICON NO on the started edit program table shown in FIG. 19, in a step 911. In a step 912, it increments the WAIT ICON NO by one. In a step 913, it sets the edit unit start flag to "0". In a step 914, it starts the edit program in the edit unit 8 corresponding to the selected icon.

FIG. 15 is a flow chart showing the operation when the edit program in the edit unit 8 is started. In a step 802, the edit window for the edit operation is opened. In a step 804, a request for the key code is made to the input control unit 5 to receive the information which the user has entered through the input unit 1. In a step 806, whether the key code received from the input control unit 5 represents the end key 114 (FIG. 3) or not, and if it is not the end key, the edit operation (for example, preparation of text, movement, copying, etc.) corresponding to the key code is effected in a step 808. The key code is again requested to the input control unit 5 in the step 804. If the key code represents the end key in the step 806, the edit operation end flag is set to "1" in a step 810, and the edit window is closed in a step 812. Finally, in a step 814, the end of the edit operation is indicated to the system control unit 9.

Turning back to FIG. 4 again, the system control unit 9 examines the edit operation end flag in a step 916 through steps 901 and 910. Since "1" has been set in the step 810 (FIG. 15), the process proceeds to a step 918. In the step 918, the status change flag is set to "1". In a step 920, the icon control unit 6 is started to place the edit program of the edit unit 8 in the non-start status.

Since the status change flag is "1", the icon control unit 6 shifts the process to the icon status change process 62 through the step 602 of FIG. 5. In the icon status change process of FIG. 6, the process proceeds to a step 638 because the job menu display flag is "0" and the job menu unit end flag is "0". In the step 638, in order to deactivate the finished edit program, the area of the start status of the icon corresponding to the finished edit program shown in FIG. 14 is set to "0". Further, in a step 640, the presence or absence of the linked icons shown in FIG. 14 is checked, and if it is present, the area of the start status of the icon corresponding to the separate icon table is set to "0" in a step 642 based on the linked icon number.

Turning back to FIG. 4, in a step 921, the WAIT ICON NO is decremented by one, and in a step 922, whether the WAIT ICON NO is "0" or not is determined in order to determine whether a status in which none of the edit programs of the edit unit 8 is started has been reached. If all icons are not activated, the status change flag is set to "1" in a step 924, the job menu display flag is set to "1" in a step 926, and the icon control unit 6 is started in a step 928 to display the job menu window 28.

In FIG. 15, if the edit unit 8 requests a key code from the input control unit 5 in the step 804, the user moves the mouse cursor 29 to the job menu area 22 or the separate icon area 24 of FIG. 2 by using the job menu key 102 or the mouse 15 of FIG. 3 and depresses the mouse left button 150. Thus, the icon control unit 6 is started from the step 514 of FIG. 9. The separate icon area is provided because if the job menu window is opened to select frequently used icons, the number of times of key entry increases and the work efficiency is lowered, and because the icon which continuously controls the work status such as printing should be immediately selected when the change of the work status is required. For those reasons, the separate area is provided so that the icon can be selected without opening the job menu window 28.

Turning back to FIG. 5, since the status change flag is "0", the icon control unit 6 shifts the process to the step 605 to determine the icon selection inhibit flag. When the job menu window 28 is open, the icon selection inhibit flag is "1". Thus, an alarm sound is generated in a step 622. If the job menu window is not open, the process proceeds to a step 606 to determine whether the input is from the job menu key 102 or not. If it is from the job menu key, whether the icon selection flag is "1" or not is determined in a step 616, and if it is "0", the icon program start process is started in a step 68. If the icon selection flag is "1", that is, if the job menu area 22 or the separate icon area 24 is selected by the mouse left button, an alarm sound is generated in a step 622. If the input is not from the job menu key in the step 606, whether the mouse left button 150 has been depressed to the ON position from the OFF position is determined in a step 608. If it has been depressed, the icon indexing process is started in a step 64. If the user moves the mouse while he/she depresses the mouse left button, the icon display status process is started in a step 612 through a step 66. If the mouse left button 150 is shifted from the ON position to the OFF position, that is, if the user releases the button, the icon program start process is started in a step 68 through a step 608. When the icon program is started, the icon selection flag is set to "0" in a step 618.

Figure 16:
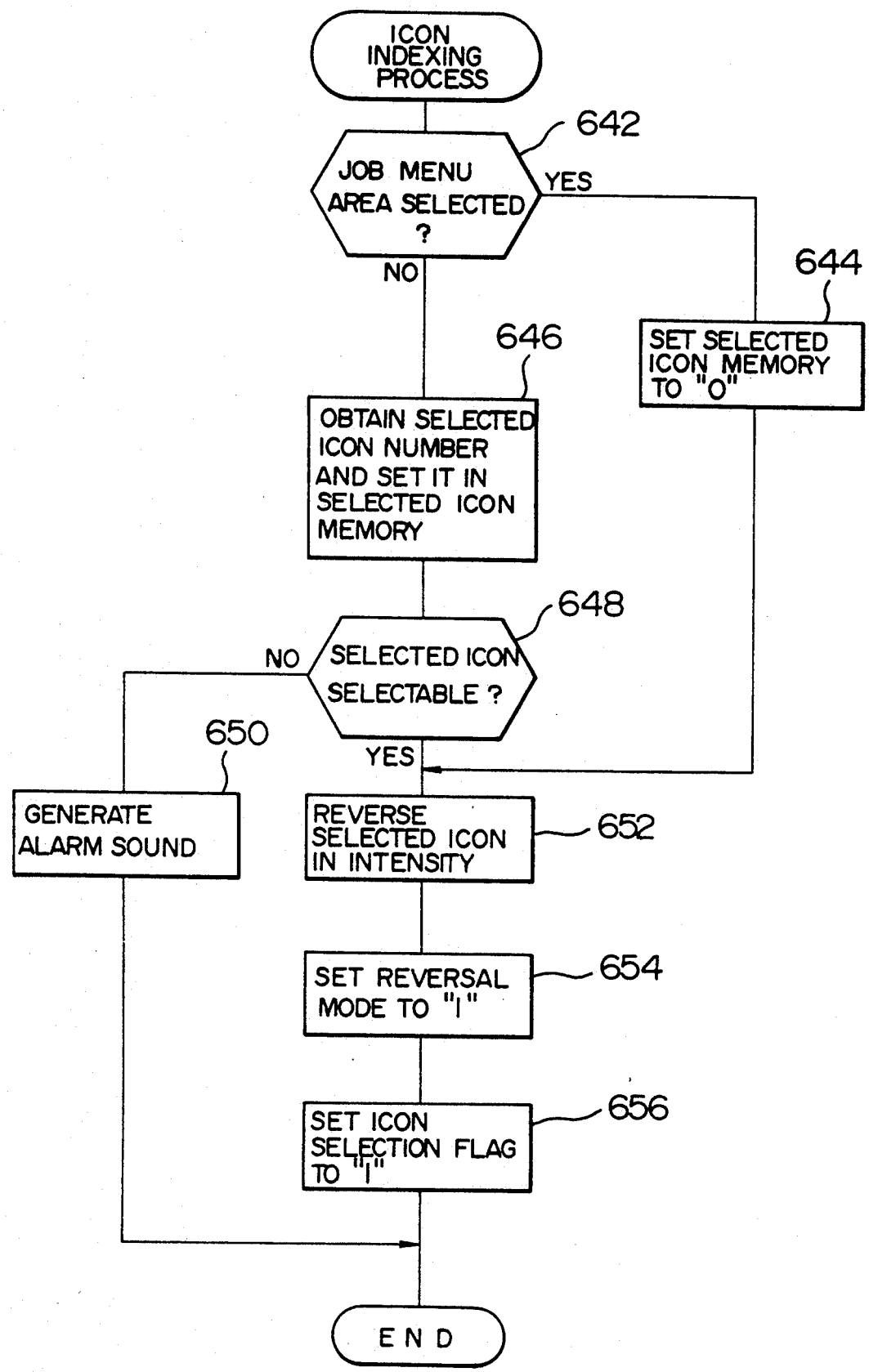
FIG. 16 is a flow chart showing an operation of an icon indexing process.

FIG. 16 is a flow chart showing the operation of the icon indexing process 64. In a step 642, whether the area selected by the user is the job menu area 22 or the separate icon area 24 is determined. If it is the job menu area 22, the selected icon memory is set to "0" in a step 644. The selected icon memory stores the icon number selected by the user. When it is "0", it means the job menu area 22, when it is "1", it means the separate icon #1, when it is "2", it means the separate icon #2, and when it is "3", it means the separate icon #3. If the separate icon area 24 is selected in the step 642, the selected icon number is stored in the selected icon memory in a step 646. In a step 648, whether the icon selected by the user has already been activated or not is determined in a step 648 by referring to the start status of the separate icon table of FIG. 14. If the start status area is "1", that is, if the icon has been activated, an alarm sound is generated in a step 650 to inform to the user of the start status. If the start status area is "0", that is, if the icon has not been activated, the selected icon is reversed in intensity in a step 652 to inform the user that the icon has been selected. In a step 654, the reversal mode is set to "1", and in a step 656, the icon selection flag is set to "1".

Figure 17:
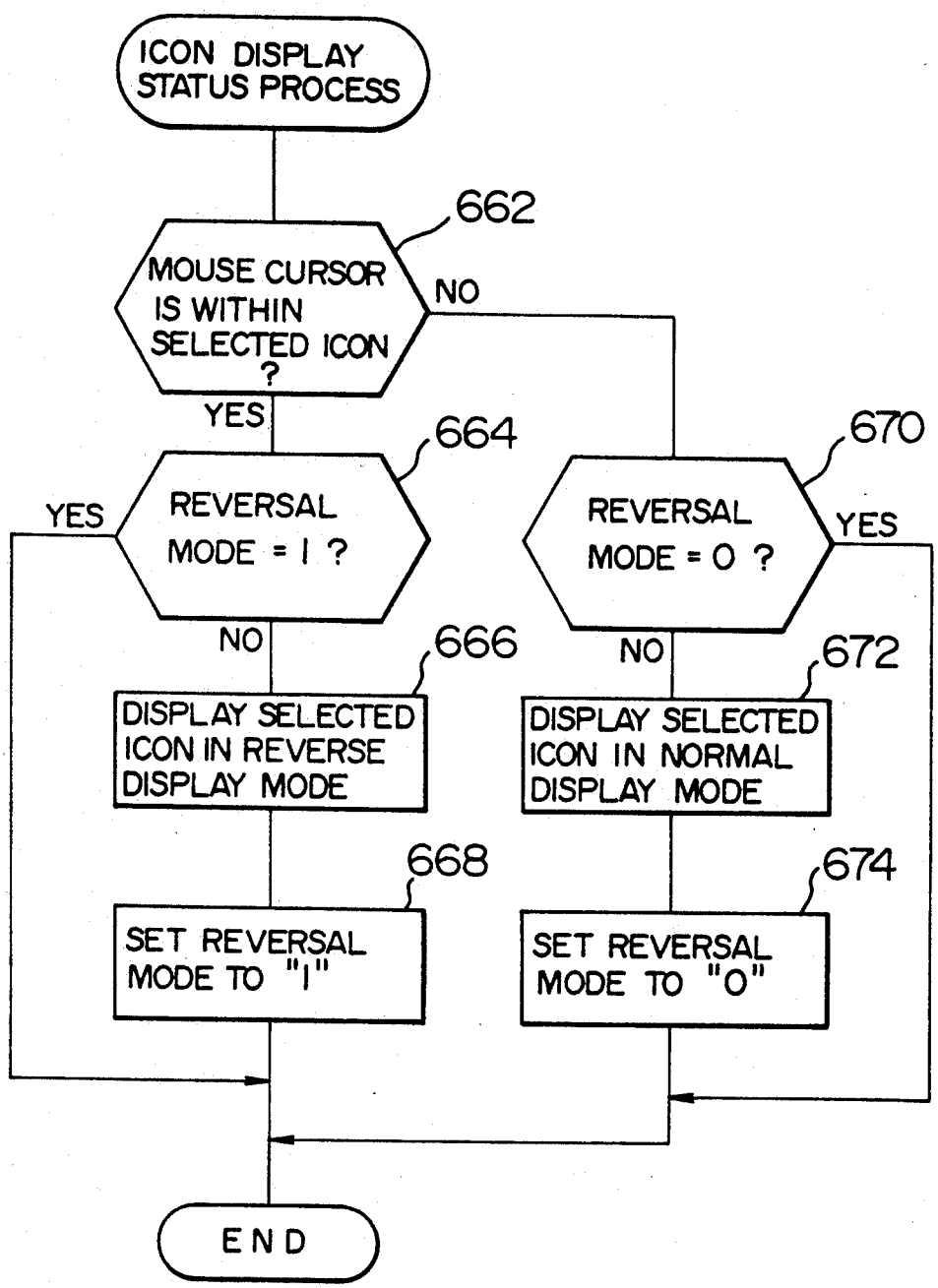
FIG. 17 is a flow chart showing an operation of an icon display status process.

FIG. 17 is a flow chart showing the operation of the icon display status process 66 (FIG. 5). In a step 662, whether the position of the mouse cursor 29 is within the area of the selected icon or not is determined. If it is within the area, whether the reversal mode is "1" or not is determined in a step 664. If it is "0", the selected icon is reversed in intensity in a step 666. Further, the reversal mode is set to "1" to inform the user that the selected icon is in a valid status. If the mouse cursor is not within the area of the selected icon in the step 662, whether the reversal mode is "0" or not is determined in a step 670. If it is "1", the selected icon is displayed in the normal display mode in a step 672, and the reversal mode is set to "0" in a step 674 to inform the user that the selected icon is in an invalid status.

Figure 18:
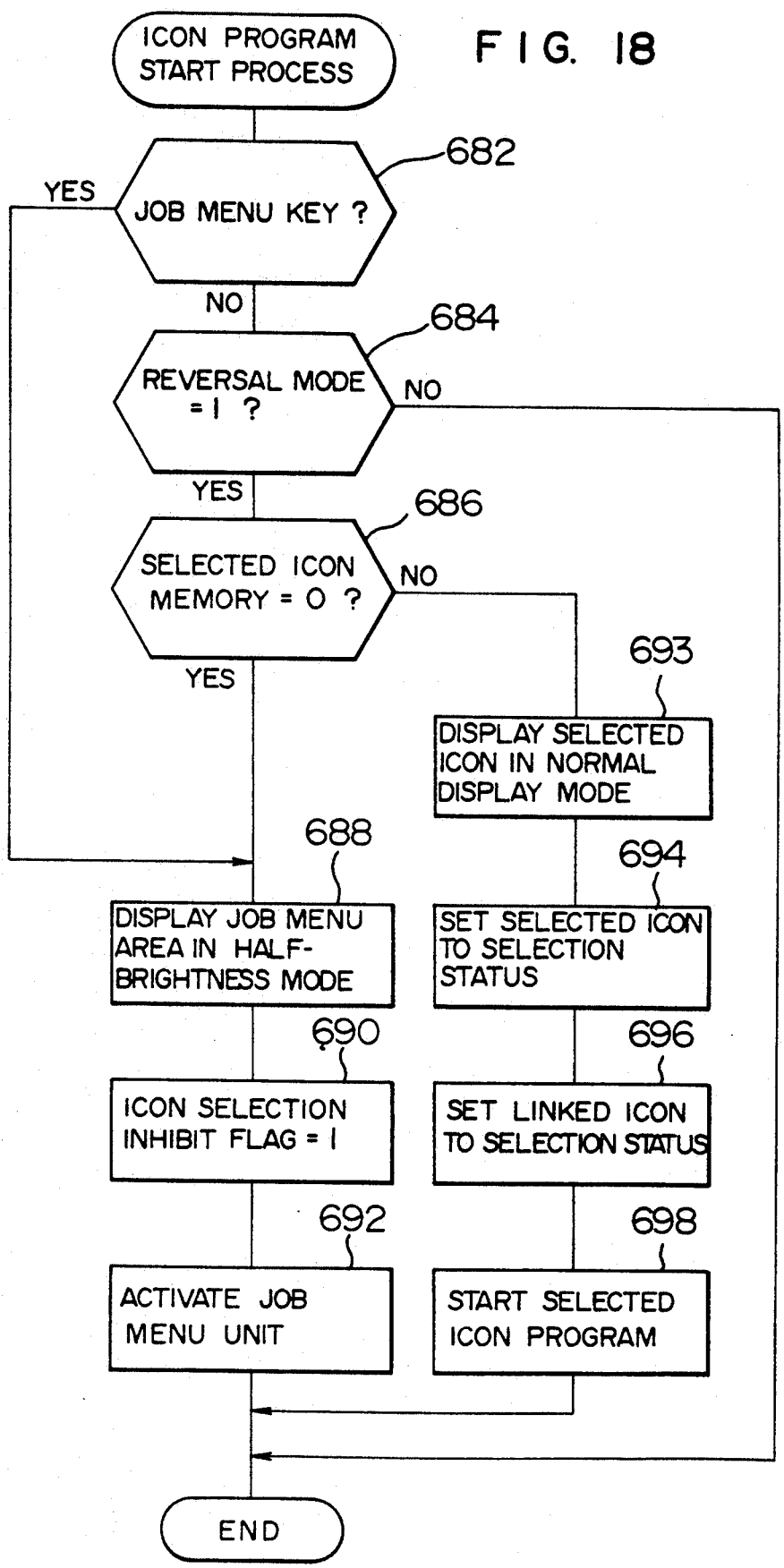
FIG. 18 is a flow chart showing an operation of an icon program start process.

FIG. 18 is a flow chart showing the operation of the icon program start process 68 of FIG. 5. In a step 682, whether it is the job menu key 102 or not is determined. If it is the job menu key, the process proceeds to a step 688. If it is not the job menu key, whether the reversal mode is "1" or not is determined in a step 684. If it is "1", it means that the icon has been selected. Thus, in a step 686, whether the selected icon memory is "0" or not, that is, whether the job menu area has been selected or not is determined. If the job menu area has been selected, the job menu area is displayed in the half-brightness mode in a step 688, and the icon selection inhibit flag is set to "1" in a step 690 to inhibit the selection of the icon area. In a step 692, the job menu unit 7 is activated to display the job menu window 28. If the selected icon area is not "0" in the step 686, the selected icon is displayed in the normal display mode in a step 693, and the start status area of the separate icon table of FIG. 14 corresponding to the selected icon is set to "1" in a step 694, and the start status area of the linked icon table is set to "1" in a step 696. Further, in a step 698, the system control unit 9 is instructed to start the edit program corresponding to the selected icon.

In accordance with the present invention, since the job menu window 28 is displayed at the center of the screen only for a required time period, the display area for data processing is wide. Further, since the icons and the descriptive texts of the functions of the icons as well as the messages for the work status of the system are displayed in the job menu window, the user can readily understand the job content and the misoperation is prevented.

If the program which uses a window other than the job menu window is not started, the job menu window is displayed to facilitate the work in the next step. The frequently used icons are continuously displayed in the separate icon area so that those icons can be directly selected without displaying the job menu window. In this manner, the work efficiency is improved.

The icon may be selected through the keyboard. Accordingly, it is not necessary for the operator to grip the mouse while he/she is manipulating the keyboard. Because the selection of the icon utilizes the visual pointing by the key cursor, chance of misoperation is reduced.

An overall operation of the data processing method and data processing apparatus of the present invention, is briefly explained in line with the time flow with reference to the functional block diagram of FIG. 1.

(1) When the power is turned on, the system control unit is first activated to request the icon control unit to display the job menu window.

(2) In response to the request to display the job menu window, the icon control unit activates the job menu unit.

(3) After the job menu unit has displayed the window, it displays the icons in the window and requests the key or mouse entry to the input control unit.

If the operator selects the icon by the keyboard or the mouse, the job menu unit requests the activation of the corresponding edit unit to the system control unit and closes the job menu window.

(4) In response to the request to activate the edit unit, the system control unit activates the corresponding program.

(5) When the edit unit is activated, it displays the window for the edit operation, and activates the input control to read in the command from the operation and conducts various edit operations.

If the operator selects the job menu key or the job menu area, the icon control unit is activated through the input control unit. The icon control unit activates the job menu unit to display the job menu window. Then, it shifts to (3).

If the operator indicates the end of the edit operation, the window is closed and this status is indicated to the system control unit.

(6) When the system control unit is informed of the end of the edit operation, it determines if the edit unit is active or not, and if the edit unit is not active, it again requests display of the job menu window by the icon control unit. Then, it shifts to (3).

The data processing method and the data processing apparatus of the present invention may display those icons as separate icons which are frequently used by the operator. This may be readily attained by storing the numbers of times of the use of icons in the external memory as frequency information, and when the power is next turned off, a reading out of the frequency information in a RAM and a selecting of the icons to be displayed as separate icons is effected in accordance with the frequency of use.

We claim:

1. For use in a data processing apparatus having input means for permitting an operator to enter data and commands; input control means for controlling the operation of said input means; display means for displaying on a display screen a work area for data processing and a job menu window as an overlay on said work area for displaying types of selectable jobs by using icons which identify the selectable jobs; icon control means for controlling the display of icons by the display means; job menu control means for controlling said display means to effect opening, displaying and closing of the job menu window; edit means for controlling said display means to effect opening and closing of an edit window in the work area and for displaying data processing in said edit window; and system control means for controlling said input control means, said icon control means, said job menu control means and said edit means; a job menu presentation method, comprising the steps of:

(a) activating said job menu control means upon power-on in response to a request from said system control means or in response to a request from said input control means commanded by the operator when the edit window is being displayed on the display screen to open the job menu window as an overlay on said work area or said edit window;

(b) displaying in said job menu window under control of said icon control means icons which indicate the types of selectable jobs available to the operator;

(c) entering by the operator through said input means under control of said input control means information selecting an icon displayed in said job menu window; and (d) closing by said job menu control means the job menu window in response to the selection of an icon by the operator.

2. A menu presentation method according to claim 1, wherein said step (b) displays the icons along with descriptive texts of a function of the respective jobs to which the icons in the job menu window relate.

3. A menu presentation method according to claim 1, further including displaying under control of said icon control means a portion of the icons displayed in the job menu window as separate icons in a separate icon area provided on the display screen separately from the work area for data processing.

4. A menu presentation method according to claim 3, wherein the separate icons displayed in said separate icon area are selected in accordance with the frequency of use of the jobs indicated by said icons.

5. A menu presentation method according to claim 3, wherein the separate icon area is provided in a periphery of the display screen separate from said work area for data processing.

6. A menu presentation method according to claim 1 wherein said step (b) includes displaying information for the operator in the job menu window.

7. A menu presentation method according to claim 1 wherein said information relates to permission or non-permission for initiating power-off operation.

8. A menu presentation method according to claim 1 wherein said information relates to information indicating that the edit operation is under way.

9. A menu presentation method according to claim 1, further comprising the steps of:
(e) opening under control of said edit means the edit window for displaying data processing;
(f) reading in data entered by the operator through said input means under control of said input control means for data processing; and
(g) shifting to said step (a) from said step (f) upon a command by the operator to display the job menu window.

10. A menu presentation method for presenting a primary job menu of data processing formed by a plurality of icons which respectively identify jobs available to an operator, comprising the steps of:
opening a primary job menu window having icons therein on a display screen;
opening an icon display window on said display screen only when an operator indicates a request to select a job;
displaying icons in said icon display window when the icon display window is opened;
closing said primary job menu window when the operator selects a job.

11. A menu presentation method for presenting a menu for data processing formed by a plurality of icons which respectively identify jobs available to an operator, comprising the steps of: opening an icon display window on a display screen only when an operator indicates a request to select a job, and displaying the icons and corresponding descriptive texts which describe a function of the related job in said icon display window when the icon display window is opened.

12. A menu presentation method for presenting a job menu for data processing formed by a plurality of icons which respectively identify jobs available to an operator, comprising the steps of:
opening a job menu window having on a display screen icons therein;
opening an icon display window on said display screen only when an operator indicates a request to select a job;
displaying icons in said icon display window when the icon display window is opened;
closing said job menu window when the operator selects a job; and
continuously displaying a portion of the icons which are displayed in said icon display window as separate icons in an area separate from the icon display window, said separate area being an area which is not overlapped by windows displayed on said display screen.

13. A menu presentation method according to claim 12, wherein the separate icons are selected in accordance with the frequency of use of jobs indicated by said icons.

14. A menu presentation method according to claim 12 wherein an area to be selected by the operator is provided at a portion of the periphery of the display screen to open the icon display window.

15. A menu presentation method according to claim 12, wherein said separate area in which said separate icons are displayed continuously is provided in the periphery of the display screen.

16. A menu presentation method according to claim 12 wherein the icon display window is automatically opened when data processing is to be started or when no other window is opened.

17. A menu presentation method according to claim 12 wherein a message to the operator is displayed in accordance with the current work status when the icon display window is open.

18. A menu presentation method according to claim 12 wherein said message relates to permission or non-permission for initiating a power-off operation.

19. A menu presentation method according to claim 12 wherein said message relates to information indicating that the edit operation is under way.

20. A menu presentation method according to claim 12, wherein the icons are selected by operating one of a keyboard and a mouse.

21. A menu presentation method for displaying a menu formed by a plurality of icons and for selecting any of the icons using a mouse cursor, comprising the steps of:
displaying by a menu icons and corresponding job descriptive texts which describe functions of jobs on a display screen;
selecting one of a job descriptive text and a menu display area;
detecting that a job descriptive text or the menu display area has been accepted as the selection of the corresponding icon; and
closing the menu in response to the selection of the icon.

22. A menu presentation method according to claim 20, further comprising the steps of displaying a key cursor for selecting one of the icons, and moving the key cursor by key entry of commands to sequentially select different icons.

23. A data processing apparatus, comprising:
input means for permitting an operator to enter input data and commands;
input control means for controlling the input operation of the input data and commands by said input means in accordance with the type of input means;
display means for displaying a work area for data processing on a display screen and a job menu window as an overlay on said work area for displaying types of selectable jobs by icons on the display screen temporarily when job selection is required;
icon control means for controlling the display of the icons in said job menu window;
job menu control means for controlling opening of the job menu window as an overlay on said work area and for closing said job menu window in response to job selecting by an operator; and edit means for controlling opening and closing of an edit window on the work area for displaying data processing in said edit window.

24. A data processing apparatus according to claim 23, wherein said display means displays the icons along with descriptive texts of a function of the respective jobs to which the icons in the job menu window relate.

25. A data processing apparatus according to claim 23, wherein said display means displays a portion of the icons displayed in the job menu window as separate icons in a separate icon area provided on the display screen separately from the work area for data processing.

26. A data processing apparatus according to claim 25, wherein the separate icons are selected in accordance with a frequency of use of the jobs indicated by said icons.

27. A data processing apparatus according to claim 25, wherein the separate icon area is provided in a periphery of the display screen separate from said work area for data processing.

28. A data processing apparatus according to claim 23 wherein information for an operator is displayed in the job menu window when the job menu window is open.

29. A data processing apparatus according to claim 28 wherein said information relates to permission or non-permission for initiating a power-off operation.

30. A data processing apparatus according to claim 28 wherein said information relates to information indicating that the edit operation is under way.

31. A data processing apparatus for presenting a plurality of icons corresponding to selectable jobs on a display screen to form a job menu for data processing, comprising:

means for opening a menu window having the icons displayed therein;

means for displaying the icons and job descriptive texts which indicate a function of the job indicated by the respective icons in the menu window;

means for instructing the opening of the menu window by an operator;

means for selecting one of the icons by the operator; and means for closing the menu window in response to selection of one of the icons.

32. A data processing apparatus according to claim 31 further comprising means for activating said means for opening the menu window when data processing is to be started or when no window other than the menu window is open.

33. A data processing apparatus for displaying a plurality of icons corresponding to jobs selectable by a cursor on a display screen to present a primary job menu of data processing by the icons, comprising:

means for displaying a menu window having the icons therein at a major portion of the display screen;

means for displaying an icon display window when an operator indicates a request to select one of the jobs;

means for closing the menu window in response to selection of one of the jobs; and means for displaying a command area which may be selected for opening the menu window provided at a portion of a periphery of the display screen.

34. A data processing apparatus for displaying a plurality of icons corresponding to jobs selectable by a cursor on a display screen to present a primary job menu for data processing by the icons, comprising:

means for displaying a menu window having the icons therein in a major portion of the display screen;

means for displaying an icon display window when an operator indicates a request to select a job;

means for closing the menu window in response to selection of a job; and means for displaying an area provided at a periphery of the display screen for continuously displaying specified ones of the icons, said area being an area which is not overlapped by windows displayed on the display screen.

35. A data processing apparatus for presenting a plurality of icons on a display screen as a primary job menu of data processing, comprising:

menu window display means for displaying a menu window having the icons therein;

start program discrimination means for discriminating a program to be started in accordance with a selected icon;

program start means for starting the program to be started;

menu window erase means for erasing the menu window after the icon has been selected; and means for activating said menu window display means when a program having a window is initiated.

36. A data processing apparatus according to claim 35 further comprising:

means for continuously displaying specified ones of the icons displayed in the menu window in a separate area on the display screen; and icon control means for accepting the selection of any of the specified icons in one of the menu window and the separate area as the selection by the other of the menu window and the separate area.

37. A data processing apparatus according to claim 35 further comprising means for examining the current work status of the apparatus when the current menu window is to be displayed and displaying a message representing the work status.

* * * * *